(12) United States Patent
Paufique

(10) Patent No.: US 12,453,696 B2
(45) Date of Patent: Oct. 28, 2025

(54) **ACTIVE PRINCIPLE COMPRISING A PARTICULAR EXTRACT OF *PUNICA GRANATUM* AND USES FOR PREVENTING AND/OR TREATING ACNE**

(71) Applicant: SOCIETE INDUSTRIELLE LIMOUSINE D'APPLICATION BIOLOGIQUE, Objat (FR)

(72) Inventor: Jean-Jacques Paufique, Objat (FR)

(73) Assignee: SOCIETE INDUSTRIELLE LIMOUSINE D'APPLICATION BIOLOGIQUE, Objat (FR)

( * ) Notice: Subject to any disclaimer, the term of this patent is extended or adjusted under 35 U.S.C. 154(b) by 484 days.

(21) Appl. No.: 17/919,380

(22) PCT Filed: Apr. 16, 2021

(86) PCT No.: PCT/EP2021/059897
§ 371 (c)(1),
(2) Date: Nov. 30, 2022

(87) PCT Pub. No.: WO2021/209593
PCT Pub. Date: Oct. 21, 2021

(65) Prior Publication Data
US 2023/0092216 A1    Mar. 23, 2023

(30) Foreign Application Priority Data

Apr. 17, 2020 (FR) .................... FR2003896

(51) Int. Cl.
*A61K 8/9789* (2017.01)
*A61Q 17/00* (2006.01)
*A61Q 19/00* (2006.01)

(52) U.S. Cl.
CPC ............ *A61K 8/9789* (2017.08); *A61Q 17/00* (2013.01); *A61Q 19/008* (2013.01)

(58) Field of Classification Search
CPC ..... A61K 8/9789; A61Q 17/00; A61Q 19/008
See application file for complete search history.

(56) References Cited

FOREIGN PATENT DOCUMENTS

| EP | 2799075 A1 | 11/2014 |
|----|------------|---------|
| KR | 20110037347 A | 4/2011 |

OTHER PUBLICATIONS

Lee, C., et al., Multiple Activities of Punica granatum Linne against Acne Vulgaris, International Journal of Molecular Sciences, Jan. 12, 2017, pp. 1-12, vol. 18, No. 141.

Bar-Yaakov, I., et al., "Primary Metabolites, Anthocyanins, and Hydrolyzable Tannins in the Pomegranate Fruit", Frontiers in Plant Science, May 17, 2019, pp. 1-19, vol. 10, No. 620.

*Primary Examiner* — Trevor Love
(74) *Attorney, Agent, or Firm* — Greer, Burns & Crain, Ltd.

(57) ABSTRACT

The invention relates to a cosmetic or dermatological active ingredient comprising at least one hydrolysate of the rind of immature fruits of *Punica granatum*, which may be in liquid form, in solid form, or in the form of a film.

The invention further relates to a composition comprising this active ingredient, to a method for obtaining the same, as well as to the use thereof for preventing and/or combating acne.

10 Claims, 3 Drawing Sheets

ACTIVE PRINCIPLE COMPRISING A PARTICULAR EXTRACT OF *PUNICA GRANATUM* AND USES FOR PREVENTING AND/OR TREATING ACNE

CROSS-REFERENCE TO RELATED APPLICATIONS

This application is a U.S. National Stage Application of PCT/EP2021/059897 filed Apr. 16, 2021, claiming the benefit of priority from French Patent Application FR2003896 filed Apr. 17, 2020, the entire disclosure of both applications is herein incorporated by reference.

FIELD OF THE INVENTION

The invention relates to a specific active ingredient for skin comprising a hydrolysate of the rind of immature fruits of *Punica granatum* that is useful in cosmetics or dermatology, particularly for preventing and/or combating acne. The invention also relates to cosmetic or dermatological compositions comprising the same, to a method for obtaining such an active ingredient, and to uses thereof.

PRIOR ART

Acne is a chronic multifactorial skin pathology of the pilosebaceous system. It manifests particularly through the appearance of various non-inflammatory or retentional skin lesions such as comedones, and inflammatory lesions such as papules, pustules, nodules, and cysts. It primarily affects the face. These imperfections are uncomfortable and difficult to hide and often lead to a negative impact on the quality of life of those who suffer from them.

Acne involves four major biological components, which are: change in the activity of the sebaceous gland, hyperkeratinization, change in the cutaneous microbiota through colonization of the bacterium *Cutibacterium acnes* (*C. acnes*), and inflammation. These four pathophysiological components of acne are biologically linked, because they all have an impact on one another without forming a vicious circle.

Many anti-acne treatments exist on the market, but many are composed of synthetic products of medicinal substances, and very few products of natural origin are truly effective. There are also active ingredients which act on one or another of the biological components of acne, but no natural active ingredient which acts on all of these four parameters.

It is the object of the invention to address this problem by proposing an active ingredient that is capable of effectively combating the multiplicity of parameters at the origin of acne.

To this end, the subject matter of the invention is a cosmetic or dermatological active ingredient comprising at least one particular extract of *Punica granatum*.

*Punica granatum*, or pomegranate, is well known and widely used.

The pomegranate fruit can be eaten fresh, in syrup, in juice, or as dried arils (whole, powder, or molasses).

Many medicinal uses are also known:
- in traditional medicine, the rind of the pomegranate fruit has astringent, antibacterial, anti-hemorrhagic, anti-inflammatory properties;
- in the Moroccan pharmacopoeia, the decoction of pomegranate rind or powder is used for the treatment of gastrointestinal diseases;
- in the Indian pharmacopoeia, extracts of the zest, flowers, leaves, and rind of pomegranate are used as antibacterials.

In cosmetics, extracts are used particularly as antioxidants in hair care and as a skin cleanser.

In addition, the use of pomegranate rind extracts has been described for anti-acne applications, particularly ethanolic extracts alone or in combination with other extracts, for reducing the quantity of sebum secreted, minimizing pores, and for an antibacterial effect. However, the inventor has demonstrated that these existing extracts of pomegranate rind do not produce satisfactory results in preventing or combating all of the biological components of acne.

The inventor has selected a precise stage in the ripening of *Punica granatum* fruits and a particular type of extraction.

Indeed, surprisingly, the specific choice of immature fruits of *Punica granatum* combined with enzymatic hydrolysis makes it possible to effectively improve the anti-acne effect compared to existing *Punica granatum* extracts.

SUMMARY OF THE INVENTION

It is therefore the object of the invention to provide a particular cosmetic or dermatological active ingredient, namely an active ingredient comprising at least one hydrolysate of the rind of immature fruits of *Punica granatum*, as well as use thereof through application to the skin in order to prevent and/or combat against acne.

The invention also relates to a method for obtaining such an active ingredient, as well as to compositions comprising the same and which are suitable for topical application to the skin.

Advantageously, the particular selection of immature fruits of *Punica granatum* combined with enzymatic hydrolysis makes it possible to fight effectively against acne, particularly to fight effectively against the four major components of acne: changes in sebogenesis, hyperkeratinization, inflammation, and changes in the microbiota.

Other characteristics and advantages will emerge from the detailed description of the invention that follows, which is provided particularly with reference to the examples, test results, comparative test results, and figures.

FIGURES

DEFINITIONS

Figure 1:
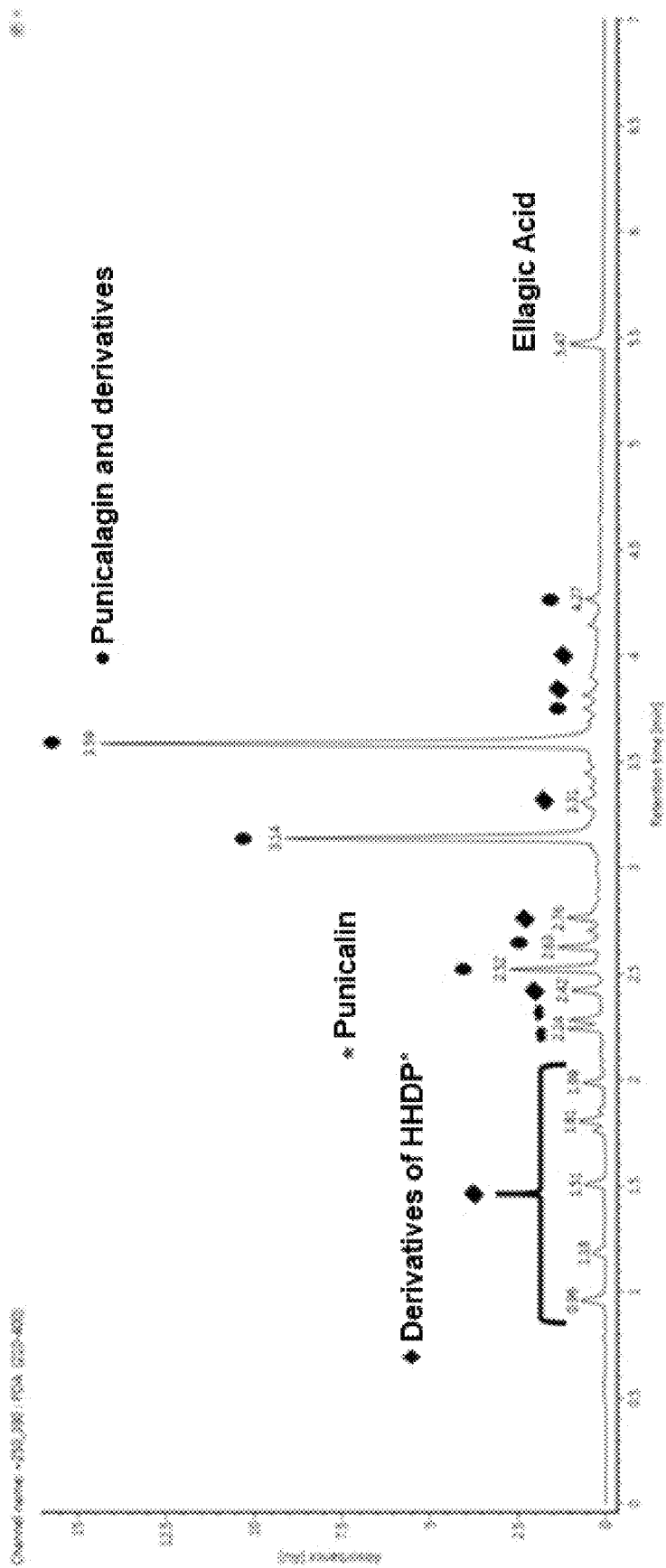
FIG. 1 shows the chromatographic profile for an extract of the rind of immature fruits of *Punica granatum* between 250 and 390 nm.

In terms of the invention, the expression "cosmetic or dermatological active ingredient" is understood to refer to at least one molecule, preferably a set of molecules, having an effect on the skin.

In terms of the present invention, an "extract" of a raw material X is understood to refer to any molecule or mixture of at least two molecules obtained from a raw material X, regardless of the method of extraction of said molecule(s). For example, it may be an extract obtained by aqueous and/or hydroalcoholic and/or hydroglycolic extraction, etc.

In terms of the invention, a "hydrolysate" of a raw material X is understood to refer to any extraction obtained from a raw material X by a method comprising at least one step of enzymatic or chemical hydrolysis of an aqueous extract. The hydrolysate is in liquid form.

In terms of the invention, an "enzymatic hydrolysate" of a raw material X is understood to refer to any extraction obtained from a raw material X by a method comprising at least one step of enzymatic hydrolysis of an aqueous extract.

In terms of the invention, a "hydroglycolic extract" of a raw material X is understood to refer to any extract obtained from a raw material X by a method comprising as its main step an extraction step which employs at least one mixture of at least two solvents (water and a glycolic solvent such as butylene glycol, for example).

In terms of the invention, an "ethanolic extract" of a raw material X is understood to refer to any extract obtained from a raw material X by a method comprising at least one step of extraction using ethanol, such as ethanol distillation, for example.

In terms of the invention, an "aqueous extraction" of a raw material X is understood to refer to any extract obtained from a raw material X by a method comprising water as the sole extraction solvent.

In terms of the invention, "film" is understood to refer to a cosmetic product which is momentarily applied to the skin and removed after a certain application time, exhibiting a cosmetic or dermocosmetic effect. It may be a mask for the face, for example.

In terms of the invention, "dry film" is understood to refer to a film having a water activity of less than 0.6.

In terms of the invention, "water activity" is understood to refer to a parameter that is well known to those skilled in the art which makes it possible to know the availability of water in the material. It can be measured using a device called a water activity (Aw) meter, for example an Aw meter of the LabSift-Aw type. The value is unitless, ranging between 0 and 1, inclusive. This parameter is different from the water content.

The term "water content" of the dry film is understood to mean the quantity of liquid water contained in the film (ratio of the weight of water to the total weight of the film) and is measured by successive weighings before and after drying in the oven.

The term "Ellagitannins" is understood to mean polyphenolic compounds which are also called ellagic tannins.

DETAILED DESCRIPTION OF THE INVENTION

I. Active Ingredient

The invention thus relates to a specific active ingredient which is particularly useful for preventing and/or combating acne.

Said active ingredient is a cosmetic or dermatological active ingredient comprising at least one particular hydrolysate of *Punica granatum*.

The active ingredient is obtained from the rind of immature fruits of *Punica granatum*. The choice of this stage of fruit maturity is essential because it contains different molecules, or the same molecules but in different quantities, from those contained in the rind of mature *Punica granatum* fruits.

Preferably, immature fruits of *Punica granatum* are understood to mean fruits:
  having a diameter of less than 10 cm, preferably less than 8 cm, and/or
  having a color which is neither red nor orange, preferably a green color.

Furthermore, the active ingredient according to the invention is a hydrolysate, meaning that it is obtained by a method comprising a stage of the hydrolysis of an aqueous extract. Preferably, it is an enzymatic hydrolysate, even more preferably an enzymatic hydrolysate obtained by hydrolysis carried out using at least one carbohydrase. According to a preferred embodiment, it is an aqueous hydrolysate, meaning that the rind of *Punica granatum* has been subjected to solubilization in water before hydrolysis. Be that as it may, the invention excludes any other extract such as ethanolic or hydroglycolic extracts of *Punica granatum*.

The active ingredient according to the invention can be in liquid form or in powder form or in the form of a film.

When it is in liquid form, the active ingredient according to the invention preferably consists exclusively of the hydrolysate of the rind of immature fruits of *Punica granatum* and water, as well as the extraction solvent. Preservatives or stabilizers can be added to facilitate the conservation and industrial use of the active ingredient.

The active ingredient according to the invention in liquid form is preferably in the form of a clear liquid, with a weak odor and an ocher to amber color. However, it can be more colored and/or it can be decolorized by any method known to those skilled in the art.

Preferably, the active ingredient according to the invention in liquid form has a dry matter content of 10 g/l to 40 g/l.

When it is in powder form, the active ingredient according to the invention consists of:
  a carrier such as maltodextrins, for example, and
  at least the hydrolysate of the rind of immature fruits of *Punica granatum* according to the invention.

In that case, the hydrolysate preferably represents at least 10% by weight of the active ingredient, and the carrier no more than 90%.

The active ingredient according to the invention can also be in the form of a dry film. In that case, the hydrolysate of the rind of immature fruits of *Punica granatum* preferably represents at least 0.1% by weight of the dry film.

When in the form of a film, the active ingredient comprises:
  at least one mineral filler, and
  at least one polymer of natural origin, and
  at least one plasticizer, and
  at least one surfactant, and
  at least the hydrolysate of the rind of immature fruits of *Punica granatum* according to the invention.

The polymer of natural origin can be selected from among: pectin, tamarind gum, alginate, pullulan, psyllium, xanthan, guar, tara, carob, agar, gum arabic, gellan, dextran, carrageenan, cellulose, konjac, and chitosan.

The plasticizer can be selected from among: glycerol, sorbitol, sucrose, erythritol, urea, propylene glycol. and butylene glycol.

The mineral filler can be selected from among: calcium carbonate, green clay, kaolin, perlite, talc, magnesium silicate, mica, diatom sericite, silica, calcium sulfate, calcium chloride, potassium chloride, iron oxide, and zinc oxide.

The active ingredient may further comprise a pigment to color the film.

Preferably, the hydrolysate comprises polyphenols, sugars, minerals, and proteins regardless of whether the active ingredient is in liquid or solid form or in the form of a film.

More preferably, the hydrolysate of the active ingredient according to the invention comprises:
at least 35% by weight of polyphenols relative to the dry matter weight of the hydrolysate, and/or
at least 25% by weight of sugars relative to the dry matter weight of the hydrolysate, and/or
less than 15% by weight of protein relative to the dry matter weight of the hydrolysate, and/or
less than 25% by weight of minerals relative to the dry matter weight of the hydrolysate.

Thus, when the active ingredient is in liquid form and consists solely of the hydrolysate, the active ingredient according to the invention comprises these constituents in these proportions.

When it is in the form of a powder, and when it consists at least of the hydrolysate and a carrier, the active ingredient according to the invention comprises:
at least 4% by weight of polyphenols relative to the dry matter weight of the active ingredient, and/or
at least 93% by weight of sugars relative to the dry matter weight of the active ingredient, and/or
less than 1% by weight of protein relative to the dry matter weight of the active ingredient, and/or
less than 2% by weight of minerals relative to the dry matter weight of the active ingredient.

The content of phenolic compounds can be determined by colorimetric assay. In the presence of potassium ferricyanide and iron chloride, phenolic compounds form colored complexes which can be determined by spectrophotometry at 715 nm. The intensity of this coloration is proportional to the quantity of phenolic compounds present in the sample. Calibration solutions are prepared from a standard of gallic acid or ellagic acid of 40 to 120 mg/l, preferably ellagic acid. A calibration curve of the optical densities of the calibration solutions is constructed as a function of their concentration. The samples are previously diluted with distilled water so that the polyphenol content corresponds to the calibration range. The quantity of polyphenols in the samples is determined using the calibration curve.

The phenolic compounds of the active ingredient according to the invention can be characterized by any suitable method, particularly by liquid chromatography coupled with mass spectrometry.

According to a preferred embodiment, the polyphenols present in the hydrolysate are Ellagitannins. The Ellagitannins present in the hydrolysate are preferably at least 50% Punicalagin and derivatives thereof, less than 40% Punicalin, less than 20% HHDP derivatives, and less than 10% Ellagic acid. Preferably, the active ingredient according to the invention comprises the Ellagitannins presented in Table 1.

TABLE 1

| Ellagitannin subfamily | Attribution |
|---|---|
| Derivatives of HHDP" | HHDP-Glucose and isomers<br>Lagerstannin C<br>Pedunculagin<br>Punicafolin<br>Punicacortein A or B<br>Vescalagin<br>Di(HHDP-galloylglucose) pentose<br>Casuariin<br>Punigluconin<br>Oenothein B |

TABLE 1-continued

| Ellagitannin subfamily | Attribution |
|---|---|
| Punicalin | Punicalin alpha and beta° |
| Punicalagin and derivatives | Punicacortein C or D<br>Punicalagin alpha and beta°<br>Digalloyl gallagil hexoside |
| Ellagic acid | Ellagic acid |

HHDP: 2,3-(S)-HexaHydroxyDiPhenoyl

The total sugar content can be determined using the DUBOIS method (Dubois M. et al. *Analytical Chemistry*, 28, 3, 350-356, 1956). All of the reducing functions are released in the presence of concentrated sulfuric acid and, together with phenol, yield a yellowish-orange colored compound. The coloration obtained as measured at 490 nm on a spectrophotometer is proportional to the quantity of total sugars in the sample.

The determination of the molar masses of the sugars is carried out by HPLC with IR detection.

The sugar moiety of the active ingredient according to the invention in powder form is preferably composed of 55% to 65% of oligosaccharides and of 35% to 45% of polysaccharides consisting of glucose and fructose. The average size of the sugars is an average molar mass of 13,140 Da.

The sugar moiety of the active ingredient in liquid form is preferably composed of 85 to 100% of oligosaccharades consisting of glucose and fructose. Their sizes are less than 3600 Da.

The assay of the proteins in the active ingredient according to the invention can be carried out particularly using the KJELDHAL method (reference: Official method of analysis of the AOC, 12th ed. W Horwitz, ED, New York, 15-60, 1975). The protein content is expressed as a percentage relative to the dry matter content. It is also possible to employ FPLC-type chromatography in order to determine the size of the peptide compounds present in the active ingredient according to the invention.

The crude ash content can be determined by weighing the residues from the incineration of the samples of the active ingredient according to the invention at 550° C. in an electric muffle furnace.

The minerals present in the active ingredient are mainly potassium, sodium, and chlorine. Other minerals such as phosphorus, magnesium, and sulfur may be present. The analysis of the minerals constituting the ashes of the active ingredient according to the invention can be carried out by optical emission spectrometry (ICP/OES), and the determination of the chloride ions can be made by titration with silver nitrate.

The hydrolysate of the rind of immature fruits of *Punica granatum* according to the invention can be obtained by any means. Preferably, it is obtained by implementing a method comprising at least one aqueous extraction and one step of enzymatic hydrolysis.

According to one especially suitable embodiment, the hydrolysate according to the invention is obtained by implementing the following steps:
a) solubilization of powder of the rind of immature *Punica granatum* fruit in water in a proportion of at least 50 g/l,
b) enzymatic hydrolysis, preferably using a carbohydrase,
c) separation of the soluble and insoluble phases by any means, making it possible to separate an insoluble phase from the soluble phase, for example by centrifugation, filtration, or decantation, d) recovery of the soluble phase, and enzymatic inactivation by any means that enables the inactivation of the enzymatic activities, for example by heat treatment, e) purification of polyphenolic compounds by any means that enables molecular sorting to be performed, f) optionally, deodorization or decoloration through the addition of a process adjuvant that enables deodorization or decoloration, g) preferably, filtration and sterilizing filtration.

The steps of the method described above, taken individually, are commonplace in the field of the extraction of active ingredients from natural raw materials, and a person skilled in the art is able to adjust the reaction parameters based on their general knowledge.

The hydrolysate obtained can be used as it is in liquid form and constitutes the active ingredient according to the invention.

The hydrolysate can then be optionally combined with a carrier and dried (atomization or lyophilization, in particular) so as to be in powder form.

The hydrolysate can also optionally be combined with compounds enabling it to be presented in the form of a dry film.

II. Composition

The active ingredient according to the invention is preferably used in compositions, these compositions comprising a cosmetically/dermatologically acceptable medium. The compositions are in different galenical forms, suitable for topical application to the skin.

These compositions can be particularly in the form of oil-in-water emulsions, water-in-oil emulsions, multiple emulsions (water/oil/water or oil/water/oil) which may optionally be microemulsions or nanoemulsions, or in the form of solutions, suspensions, hydrodispersions, aqueous gels or powders. They can be more or less fluid and have the appearance of creams, emulsions, gels, or films, or any other appearance of skin care cosmetics.

They can be compositions comprising at least 0.1% of an active ingredient according to the invention in liquid form, preferably between 0.1 and 10% or at least 0.05% of the active ingredient according to the invention in powder form, preferably between 0.05% and 2%.

In addition to the active ingredient, these compositions comprise a physiologically acceptable and preferably cosmetically and/or dermatologically acceptable medium, i.e., one that does not cause sensations of discomfort that are unacceptable to the user, such as redness, tightness, or tingling.

As an additive, the compositions according to the invention may contain at least one compound selected from among:
 oils, which can be selected particularly from among linear or cyclic, volatile or non-volatile silicone oils;
 waxes such as ozokerite, polyethylene wax, beeswax, or carnauba wax;
 silicone elastomers;
 surfactants, preferably emulsifiers, whether non-ionic, anionic, cationic, or amphoteric;
 cosurfactants such as linear fatty alcohols;
 thickening and/or gelling agents;
 humectants, such as polyols like glycerin;
 dyes, preservatives, fillers;
 tighteners;
 sequestrants;
 perfumes;
 and mixtures thereof, without this list being exhaustive.

Examples of such additives are cited particularly in the CTFA Dictionary (*International Cosmetic Ingredient Dictionary and Handbook*, published by the Personal Care Product Council).

Of course, a person skilled in the art would take care to select any additional compounds, active or non-active, and the quantity thereof such that the advantageous properties of the mixture are not, or not substantially, altered by the addition envisaged.

These compositions are particularly intended to be used for improving the quality of the skin, particularly for preventing and/or combating acne.

Preferably, the composition comprising the cosmetic active ingredient according to the invention is applied at least once a day for at least 14 days.

III. Use

The active ingredient and the compositions according to the invention are particularly effective for treating the skin topically and particularly for an effect in preventing or treating acne.

The subject matter of the invention therefore also includes an active ingredient according to the invention or a composition comprising the same for use in the prevention and/or treatment of acne. The invention thus relates to the use of a hydrolysate of the rind of immature fruits of *Punica granatum* for preventing and/or combating acne.

The active ingredient according to the invention is capable of positively influencing these four biological components of acne.

With regard to the alteration of the sebaceous gland, the first component of acne, the active ingredient according to the invention is capable of acting on the various factors that increase sebogenesis.

Indeed, the metabolism of the sebaceous glands is activated under the influence of various endogenous factors (e.g., hormones, *C. acnes*, lipophagic activity) and exogenous ones (e.g., stress), which is characterized by quantitative and qualitative changes in the sebum. This results in an increase in sebogenesis and, consequently, in an abnormally high production of sebum.

The active ingredient according to the invention is also capable of acting on hyperkeratinization, another component of acne.

Hyperkeratinization is an early biological event in the development of acne lesions. It is characterized by an anomaly of proliferation and keratinization of the follicular keratinocytes, promoting the obstruction of the excretory duct, poor evacuation of the sebum, and consecutively the dilation of the pilosebaceous duct at the origin of the formation of a microcomedone.

The active ingredient according to the invention also acts on inflammation, the third component of acne.

Inflammation is the biological phenomenon concomitant with all the stages of the formation of acne lesions: microcomedone, comedone, inflammatory lesion, post-inflammatory erythema, and even scarring. The bacterium *C. acnes* plays an essential role in the appearance of inflammatory lesions. It stimulates the production of pro-inflammatory mediators by several cell types of the pilosebaceous unit (keratinocytes, sebocytes, immune cells infiltrating acne lesions).

Finally, the active ingredient according to the invention has the ability to act on the cutaneous microbiota of acne-prone skin.

The bacterium *Cutibacterium acnes* (*C. acnes*) is considered to be one of the major pathogenic factors contributing to the development of acne. Acne is characterized by a loss of phylotypic diversity of *C. acnes* in favor of the IA1 phylotype. The population of *C. acnes* phylotype IA1 has the ability to communicate and organize itself in order to set up virulence factors (e.g., the formation of biofilms) via the quorum sensing system and thus colonize the follicle.

The active ingredient according to the invention, or the compositions containing the same, act on the primary alterations that are induced during acne:
  by normalizing the activity of the sebaceous gland,
  by exerting keratolytic activity,
  by reducing the inflammatory response,
  and by controlling the cutaneous microbiota altered by colonization by *C. acnes*.

By normalizing these four parameters, the active ingredient according to the invention restores the homeostasis of acne-prone skin.

III. A/ Influence on the Quantitative and Qualitative Changes in the Sebum

Acne is a pathology that is characterized by quantitative and qualitative changes in the sebum. The physiopathology of this skin disorder is associated with an increase in the production of sebum and an alteration of its lipid composition. The metabolism of the sebaceous glands is influenced by various endogenous and exogenous factors:

Hormone Sensitivity:

The sebaceous glands are sensitive to androgens. They possess the enzymatic equipment necessary to metabolize testosterone into dihydrotestosterone (DHT) and specific DHT receptors. Stimulation of these receptors activates genes involved in sebum production. In acne, there is an increase in the quantity and activity of the enzymes of the sebaceous gland involved in the metabolism of testosterone and, particularly, of type-I 5-alpha-reductase, resulting in an overproduction of DHT. Moreover, the number of DHT receptors is increased in acne-prone subjects, as is their sensitivity to DHT. This is why acne is considered to be a "peripheral hormonal disease."

Advantageously, the active ingredient according to the invention inhibits the conversion of testosterone into DHT and thus limits the excess of androgens involved in the physiopathology of acne.

Colonization by *C. acnes*:

Sebum is a prime substrate for the growth of microorganisms contributing to the development of acne, such as *C. acnes*. *C. acnes* has been shown to possess lipogenesis-stimulating activity. In acne, the hyperproliferative bacterium would be able to stimulate the production of lipid droplets by sebocytes directly, or indirectly via soluble factors. Through this mechanism, *C. acnes* is capable of aggravating hyperseborrhea, a major pathophysiological component of acne.

Advantageously, in response to the cutaneous aggression by *C. acnes*, the active ingredient according to the invention limits the secretion of lipids in the sebocytes.

Neural Impact Due to Stress:

A good deal of recent clinical research supports the hypothesis of the influence of neurotransmitters on the course of acne. Indeed, negative emotions such as stress are capable of exacerbating the symptoms. From a neurological point of view, the peculiarity of acne-prone patients is that they possess increased innervation in the vicinity of the sebaceous glands. These morphological observations support the existence of true communication between the nervous system and the sebaceous glands. As a matter of fact, the latter have specific receptors for neuropeptides, particularly substance P, which—once activated—lead to the production of sebum.

Advantageously, the active ingredient according to the invention inhibits the secretion of lipids induced by substance P or by the combination of *C. acnes* and substance P on sebocytes.

Alteration of the Lipophagic Activity of Sebocytes:

Recent research has demonstrated an activation of autophagy in normal sebocytes. When the function of this process is impaired, morphological and functional changes appear in the sebaceous gland. The latter becomes hypertrophic, lipogenesis is increased, and the lipid composition of the sebum is modified. mTORC1, a potent autophagy inhibitor and lipid production regulator, is observed to be highly expressed in acne-prone skin and thus represents a link between the quantitative and qualitative changes in the sebum and an inactivation of autophagy.

Advantageously, the active ingredient according to the invention restores the mechanism of lipophagy in differentiated human sebocytes.

By limiting the impact of bacterial, hormonal, and neuropeptide mediators on sebocytes while restoring the lipophagy mechanism, the active ingredient according to the invention makes it possible to normalize the activity of the sebaceous gland, a key biological component of the physiopathology of acne.

III. B/ Influence on Hyperkeratinization

The active ingredient according to the invention is also capable of acting on the hyperkeratinization that occurs in acne.

Hyperkeratinization is an early biological event in the development of acne lesions. It is an anomaly involving the proliferation and keratinization of the keratinocytes that line the wall of the follicle. It leads to an accumulation of corneocytes and obstruction of the excretory duct. These changes alter the normal evacuation of sebum, causing retention and dilation of the pilosebaceous duct, resulting in the formation of a microcomedone. The latter is a preclinical lesion that is invisible to the naked eye and characterized histologically by the distention of the wall of the follicle, evolving gradually toward the comedone.

From a biological point of view, the phenomenon of hyperkeratinization is characterized by an increase in keratins, particularly cytokeratin-16 (CK-16), the presence of which is greatly increased in acne lesions. These observations made it possible to qualify cytokeratin-16 as a hyperkeratinization marker linked to acne.

Several factors are involved in the phenomenon of hyperkeratinization, including:

Change in the Composition of the Sebum:
  The quantitative and qualitative changes in sebum observed in acne are associated with the appearance of defects in the proliferation and keratinization of keratinocytes lining the wall of the pilosebaceous duct. Squalene, a component of sebum, is the main source of peroxide lipids in acne-prone skin. Beyond causing skin irritation, peroxidized squalenes exert a strong comedogenic influence.

Colonization by *C. acnes*.

By colonizing the pilosebaceous duct, *C. acnes* is able to modify the biology of keratinocytes and influence proliferation and differentiation thereof. The bacterium stimulates the synthesis of pro-inflammatory cytokines in the pilosebaceous follicle, particularly interleukin 1α (IL-1α), a major factor in the appearance of hyperkeratinization. Indeed, this cytokine is capable of activating the genes encoding for cytokeratins, particularly CK-16, but also of inducing the production of other keratins such as CK-5. What is more, studies have shown that *C. acnes* is able to exert a direct effect on keratinocyte biology and the formation of microcomedones.

Advantageously, a hydrolysate of immature *Punica granatum* fruit rind according to the invention is able to have an effect on the hyperkeratinization that occurs in acne. In particular, when applied to the skin, the active ingredient according to the invention is capable of:

renormalizing the thickness of the stratum corneum, and
decreasing the synthesis of the cytokeratins CK-5 and CK-16.

III. C/ Influence on Inflammation

The active ingredient according to the invention is also capable of acting on the inflammation that occurs in acne.

Inflammation is a fundamental process that is present throughout the development of acne lesions. In fact, it is present from the early stages to the latest stages of the pathology. As a major bacterium associated with the pathogenesis of acne, *C. acnes* actively participates in the creation of an inflammatory environment. By colonizing the pilosebaceous follicle, the bacterium plays an essential role in triggering the inflammatory reaction and the appearance of inflammatory lesions. It stimulates the production of inflammatory mediators by several cell types of the pilosebaceous unit. In addition, exogenous and endogenous factors such as hormones, stress, composition of the sebum, etc., accentuate the inflammatory phenomenon.

Several cell types of the pilosebaceous follicle are involved in these inflammatory mechanisms: keratinocytes and sebocytes, but also immune cells infiltrating the acne lesions.

Keratinocyte Inflammation.

In acne-prone skin, the change in the composition of the sebum and, in particular, the peroxidation of the squalenes influences the inflammatory state of the pilosebaceous follicle by stimulating the secretion by the keratinocytes of pro-inflammatory cytokine IL-1α. In addition, the colonization of the pilosebaceous follicle by *C. acnes* leads to the production and secretion by the keratinocytes of numerous pro-inflammatory mediators:

pro-inflammatory cytokines (IL-8, IL-1α, etc.);
chemokines (CCL5, CCL20, CXCL1, etc.);
metalloproteinases (MMP2, MMP9, etc.).

Advantageously, the active ingredient according to the invention inhibits the secretion of chemokines, cytokines and metalloproteinases in 3D-reconstructed epidermis mimicking acne-prone skin.

Sebocyte Inflammation.

Acne is characterized by a change in the composition of the microenvironment of the sebaceous follicles, inducing colonization and increased metabolic activity of *C. acnes*. The bacterium is able to induce an inflammatory response at the level of the sebocytes, which produce numerous pro-inflammatory mediators. Among these, sebocytes secrete pro-inflammatory cytokines (IL-6, IL-8, etc.), contributing to the inflammatory reaction observed in acne lesions. The secretion of these mediators gives sebocytes the ability to promote the differentiation of naive helper T lymphocytes into Th17, thus reinforcing the inflammatory phenomenon.

In addition, the sebaceous gland is sensitive to negative emotions such as stress. It has been shown that acne-prone patients present increased innervation in the vicinity of the sebaceous glands, testifying to the existence of communication between the nervous and sebaceous systems. The pathogenic role of substance P as a neuromediator of inflammation in acne is currently well described in the literature. It leads to the secretion of pro-inflammatory cytokines (IL-6, IL-8, etc.), exacerbating the inflammatory environment of the sebaceous glands.

The remainder of the description will show that the active ingredient according to the invention inhibits the secretion of IL-6 and IL-8 by human sebocytes subjected to inflammation by substance P and/or *C. acnes*.

Th17 Lymphocyte Inflammation:

An infiltrate of immune cells that is composed primarily of CD4$^+$ helper T lymphocytes is present in acne lesions. Recently, studies have highlighted the Th17 profile of these cells, suggesting that acne is a pathology in which the Th17 lymphocytes contribute significantly to the inflammatory phenomenon. *C. acnes* has been shown to possess the ability to induce differentiation of naive lymphocytes into Th17 lymphocytes. These cells produce a pro-inflammatory cytokine that is involved in many inflammatory pathologies, interleukin 17 (IL-17), whose quantity is also found to be increased in acne lesions. The presence of IL-17 leads to the secretion of pro-inflammatory mediators by epithelial cells, such as IL-8 and CCL20, thus exacerbating the inflammatory process.

The appearance and exacerbation of the inflammatory phenomenon described in acne lesions therefore involves various protagonists and factors. The inflammatory mediators produced promote comedogenesis followed by rupturing of the follicle, leading to the appearance of inflammatory lesions.

Advantageously, the active ingredient is capable of regulating the biology of LTh17 and of limiting the inflammation induced by these cells.

Thus, a hydrolysate of the rind of immature fruits of *Punica granatum* is able to have an effect on the inflammation that occurs in acne. In particular, when applied to the skin, the active ingredient according to the invention is capable of:

regulating the biology of the acne-prone epidermis and limiting the inflammation marker of the physiopathology of acne, particularly by inhibiting the secretion of CCL5, CCL20, CXCL1, by inhibiting the secretion of IL-1α, IL-8, and by inhibiting the secretion of MMP2 and MMP9;

regulating the biology of LTh17 and thus limiting the inflammation induced by these cells, which are important actors in the physiopathology of acne;

limiting the sebocyte inflammation that is characteristic of the physiology of acne, particularly by inhibiting the secretion of IL-6 and IL-8.

III. D/ Influence of *C. acnes* on the Microbiota

The active ingredient according to the invention is capable of acting against *C. acnes*.

*Cutibacterium acnes* (*C. acnes*) is a major species of the cutaneous commensal flora whose preferred habitat is the pilosebaceous follicle. This bacterium is considered to be one of the major pathogenic factors contributing to the development of acne. Studies carried out on *C. acnes* and its role in acne have brought to light new data and mechanisms explaining its virulence in the pathology.

Phylotypes of *C. acnes*.

Recently, taxonomic studies based on genomic and biological investigations have identified different subtypes of the species *C. acnes* and classified them into three phylotypes: I, II, and III. Further phylogenetic studies led to the re-segmentation of phylotype I into four phylotypes: IA1, IA2, IB, and IC. The bacterial species *C. acnes* is therefore currently classified into six different phylotypes with distinct biochemical and virulence characteristics.

In acne, a loss of phylotypic diversity of *C. acnes* in favor of the IA1 phylotype was observed compared to healthy skin. This phylotype has a greater capacity to form biofilms than the others. It has thus been described as the virulent phylotype associated with the development of acne lesions.

The preponderance of *C. acnes* IA1 contributes to the pathogenesis of acne by inducing numerous changes in the pilosebaceous environment. Indeed, it acts on the other components involved in the physiopathology of acne by:
  inducing an increase in lipogenesis and modifying the sebum lipids;
  stimulating sebocytes, keratinocytes, and immune cells to produce the numerous cytokines, chemokines, and matrix metalloproteinases involved in the inflammatory phenomenon observed in acne;
  changing the biology of keratinocytes and thus promoting hyperkeratinization at the origin of the formation of microcomedones.

The bacterial component therefore constitutes an important parameter in the development of acne lesions. Targeting the bacterium *C. acnes* phylotype IA1 and reducing its virulence is an essential strategy in the fight against this pathology.

Advantageously, the active ingredient according to the invention limits the growth of the bacterium *C. acnes* phylotype IA1.

Quorum Sensing and Biofilm.

In acne-prone skin, microcomedones constitute lipid-rich anaerobic microenvironments that are favorable to the growth and establishment of *C. acnes*. Indeed, the latter can behave like a pathogenic opportunistic bacterium thanks to a biofilm growth mode. The biofilm is a heterogeneous structure constituted by the bacterial population embedded in an extracellular matrix of DNA, proteins, and polysaccharides produced by the same, all adhering to a surface. This biofilm growth confers properties to bacteria in terms of their morphology, growth, communication, and resistance to biocides for the purpose of optimizing their survival.

For a long time, prior to the discovery of an interbacterial communication system called quorum sensing (QS), bacteria were regarded as individual and asocial entities. QS involves the production, secretion, and sensing by bacteria of small communication molecules called autoinducers (AI). It enables bacteria to communicate in order to put in place a precise response to the signals they perceive and thus adapt their way of life so that it is most conducive to their survival. Via this system, they synchronize the regulation of their genes, particularly those involved in virulence (Mion et al. 2019; Jiang et al. 2019). Indeed, several studies have highlighted the role of QS in the formation of biofilms, particularly in acne where *C. acnes* produces autoinducer 2 (AI-2) via the enzyme LuxS (Lwin, Kimber, and McFadden 2014).

The active ingredient according to the invention also exhibits an antibacterial effect against the bacteria that are involved in acne, particularly *C. acnes* of phylotype IA1. The direct antibacterial efficacy of the active ingredient according to the invention is real, since it
  exhibits a bacteriostatic effect by inhibiting the growth of *C. acnes*,
  reduces the quorum sensing activity of *C. acnes*, and
  also inhibits biofilm formation.

By virtue of this novel approach, the active ingredient according to the invention is capable of targeting the four major components of the physiopathology of acne. It normalizes the activity of the sebaceous gland. It also possesses keratolytic activity and controls colonization by *C. acnes*. It reduces sebocyte, keratinocyte, and Th17-type lymphocyte inflammatory responses. Finally, it acts directly as an antibacterial by limiting the growth of *C. acnes* and by inhibiting quorum sensing and the formation of a bacterial biofilm.

Its therapeutic efficacy has been clinically demonstrated on adult volunteers suffering from mild to moderate acne: the number of acne lesions is significantly reduced, with a lower GEA score. This active ingredient improves the quality and appearance of acne-prone skin. It is a high-performance care product that combines rapid action and efficacy in the daily care of acne-prone skin.

The invention thus relates to the use of an active ingredient comprising a hydrolysate of immature pomegranate fruit rind on acne-prone skin for
  reducing retentional and inflammatory acne lesions, and/or
  reducing non-inflammatory acne lesions, and/or
  attenuating the oily appearance of the skin, and/or
  attenuating the shiny appearance of the skin, and/or
  diminishing the marks on the skin associated with acne pimples, and/or
  making pores less visible, and/or
  refining skin texture.

The invention thus also relates to a non-therapeutic method, namely a non-therapeutic cosmetic method for treating the skin for an anti-acne effect, which consists in the topical application to the skin of a composition comprising an active ingredient according to the invention.

IV. Examples and Test Results

The invention will now be illustrated by examples and test results which demonstrate the novel and inventive nature of the active ingredient both in terms of the choice of the raw material used (immature pomegranate rind) and in the method for obtaining it in order to target the desired multifactorial efficacy.

IV.A Example of Active Ingredients, and Comparison with Existing Pomegranate Extracts IV.A1. Example 1: Example of the Active Ingredient According to the Invention in Liquid Form The active ingredient is obtained by implementing the following steps:
  a) solubilization of powder of the rind of immature *Punica granatum* fruit in water in a proportion of 50 g/l,
  b) enzymatic hydrolysis with the aid of a carbohydrase,
  c) separation of the soluble and insoluble phases by centrifugation, d) recovery of the soluble phase, and enzymatic inactivation by heat treatment,
e) purification by filtration of polyphenolic compounds,
f) deodorization through the addition of a process adjuvant that enables deodorization,
g) filtrations and sterilizing filtration.

The active ingredient obtained has the following analytical characteristics:
- a dry material content of 14.8 g/l,
- a total polyphenol content (range of ellagic acid) of 5.5 g/l, or 37% by weight of dry matter
- a total sugar content of 5.2 g/l, or 35% of the hydrolysate by weight of dry matter (calculated with the aid of a range of glucose)
- a peptide content of 0.28 g/l, or 2% of the hydrolysate by weight of dry matter (determined by the KJELDAHL method)
- and 1.6 g/l of ash, or 11% by weight of dry matter (determined by weighing the residues resulting from the incineration of the hydrolysate samples at 550° C. in an electric muffle furnace).

The polyphenols of the hydrolysate are Ellagitannins, more precisely Punicalagin and derivatives thereof, Punicalin, HHDP derivatives, and Ellagic acid.

IV.A2. Example 2: Example of Active Ingredient According to the Invention in Powder Form The active ingredient is obtained by implementing the following steps:
a) solubilization of powder of the rind of immature *Punica granatum* fruit in water in a proportion of 50 g/l,
b) enzymatic hydrolysis with the aid of a carbohydrase,
c) separation of the soluble and insoluble phases by centrifugation,
d) recovery of the soluble phase, and enzymatic inactivation by heat treatment,
e) purification by filtration of polyphenolic compounds,
f) introduction of maltodextrin in a proportion of 90% (v/v),
g) concentration, sterilization, and atomization.

The active ingredient comprising the hydrolysate according to the invention and a carrier and obtained by implementing the method described above has the following analytical characteristics:
- a dry matter content of 965 mg/g of active ingredient,
- a total sugar content of 897.5 mg/g, or 93% of the active ingredient by weight of dry matter (calculated with the aid of a range of glucose),
- a total polyphenol content (range of ellagic acid) of 38.6 mg/g, or 4% of the active ingredient by weight of dry matter,
- a peptide content of 1% of the active ingredient by weight of dry matter (determined by the KJELDAHL method), and
- 2% ash by weight of dry matter (determined by weighing the residues from the incineration of the hydrolysate samples at 550° C. in an electric muffle furnace).

The polyphenols present in the hydrolysate are Ellagitannins. These are Punicalagin and derivatives thereof, Punicalin, HHDP derivatives, and Ellagic acid.

IV.A3. Example 3: Example of Active Ingredient According to the Invention in the Form of a Film The active ingredient in the form of a film containing the active ingredient can be obtained by the following method:
a) solubilization of powder of the rind of immature *Punica granatum* fruit in water in a proportion of 50 g/l,
b) enzymatic hydrolysis with the aid of a carbohydrase,
c) separation of the soluble and insoluble phases by centrifugation,
d) recovery of the soluble phase, and enzymatic inactivation by heat treatment,
e) purification by filtration of polyphenolic compounds,
f) addition of polymers of natural origin, plasticizers, mineral fillers, and surfactant,
g) deposition of the solution on a carrier,
h) evaporation of water in an oven heated to a temperature between 70 and 100° C.,
i) laser-cutting to the desired shape.

The active ingredient according to the invention obtained by implementing the method described above has the following composition: 28.3% polymers of natural origin, including carrageenans, guar, and cellulose, 49.5% plasticizers, including urea and glycerol, 20.5% mineral fillers, including silica and kaolin, and 1.2% surfactant and 0.5% immature *Punica granatum* extract.

IV.A4. Comparative Tests Demonstrating the Inventive Character of the Active Ingredient According to the Invention A. Comparison of Commercial Juice, Fresh Juice, and Rind The objective of this study is to compare the efficacy of several pomegranate products. A commercial pomegranate juice was selected. A fresh pomegranate juice was prepared by pressing pomegranates. An aqueous extraction of fresh pomegranate rind was performed by aqueous solubilization in a proportion of 200 g/l and filtration. Dilutions were performed in order to obtain products with similar dry matter contents.

These three products were compared to the hydrolysate of Example 1. The information is presented in Table 3.

TABLE 3

| Characteristic of the raw material | Dry matter content (g/l) | % Ellagitannins vs Hydrolysate |
|---|---|---|
| Hydrolysate of immature pomegranate rind | DM = 13 g/l | 100% |
| Extract of fresh pomegranate rind | DM = 14.3 g/l | 54% |
| Fresh pomegranate juice | DM = 13.5 g/l | 0% |
| Commercial pomegranate juice | DM = 11.6 g/l | 5% |

For similar dry matter contents (11.6 g/l to 14.3 g/l), the 4 products show strong differences in terms of Ellagitannin content. The hydrolysate of immature pomegranate rind has a much higher Ellagitannin content than both fresh pomegranate juice and commercial pomegranate juice and than fresh pomegranate rind extract.

B. Comparison of Immature Fruits Vs. Mature Fruits

In the context of this comparison, an "immature" fruit harvested at the start of summer has a green rind, a diameter of less than 8 cm, and presents specific markers (high content of punicalagin & derivatives), whereas a "mature" fruit harvested at the end of autumn has an orange/red rind, a diameter of greater than 10 cm, and presents different markers (high punicalin content).

Commercially available pomegranate rinds are a byproduct of the pomegranate juice industry. The pomegranate rinds from that industry are therefore always mature pomegranate rinds, so that the pomegranate juice is sweet and mild in taste.

Figure 2:
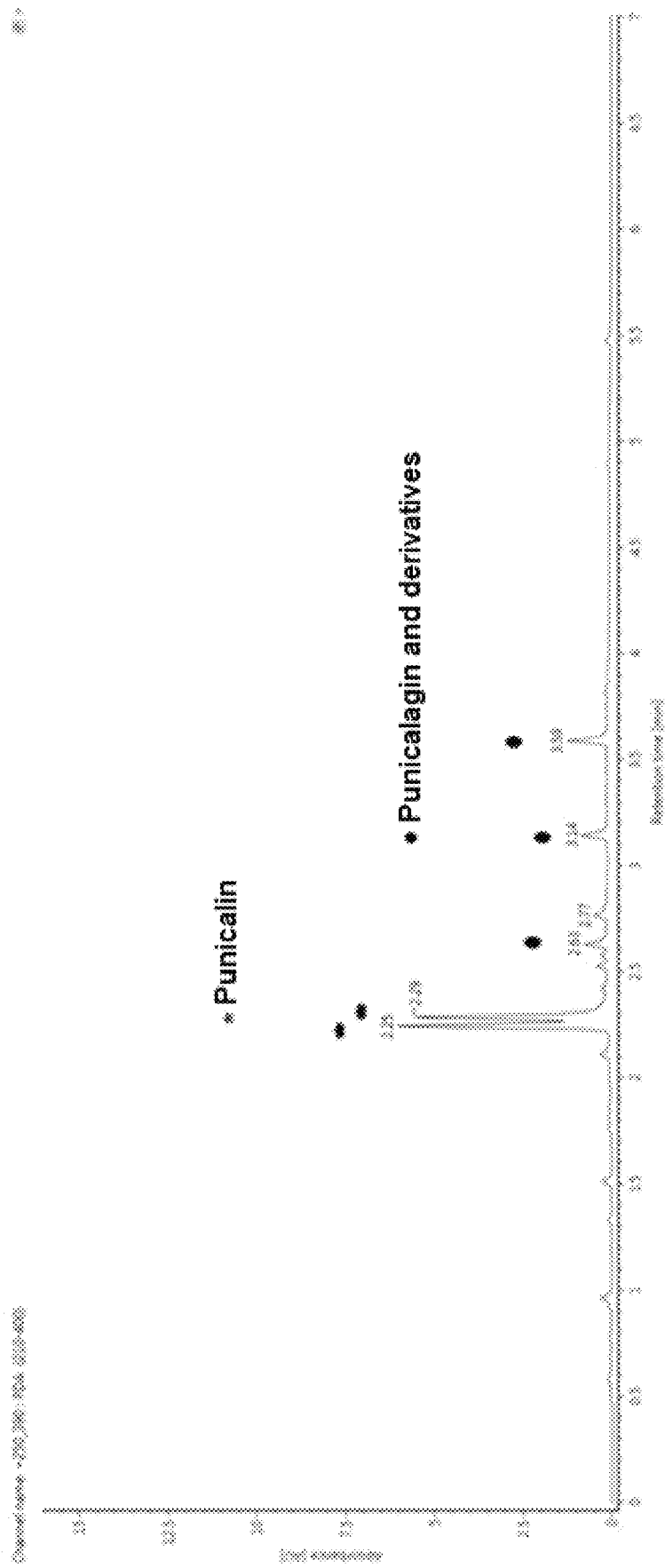
FIG. 2 shows the chromatographic profile for an extract of the rind of mature fruits of *Punica granatum* between 250 and 390 nm.
Figure 3:
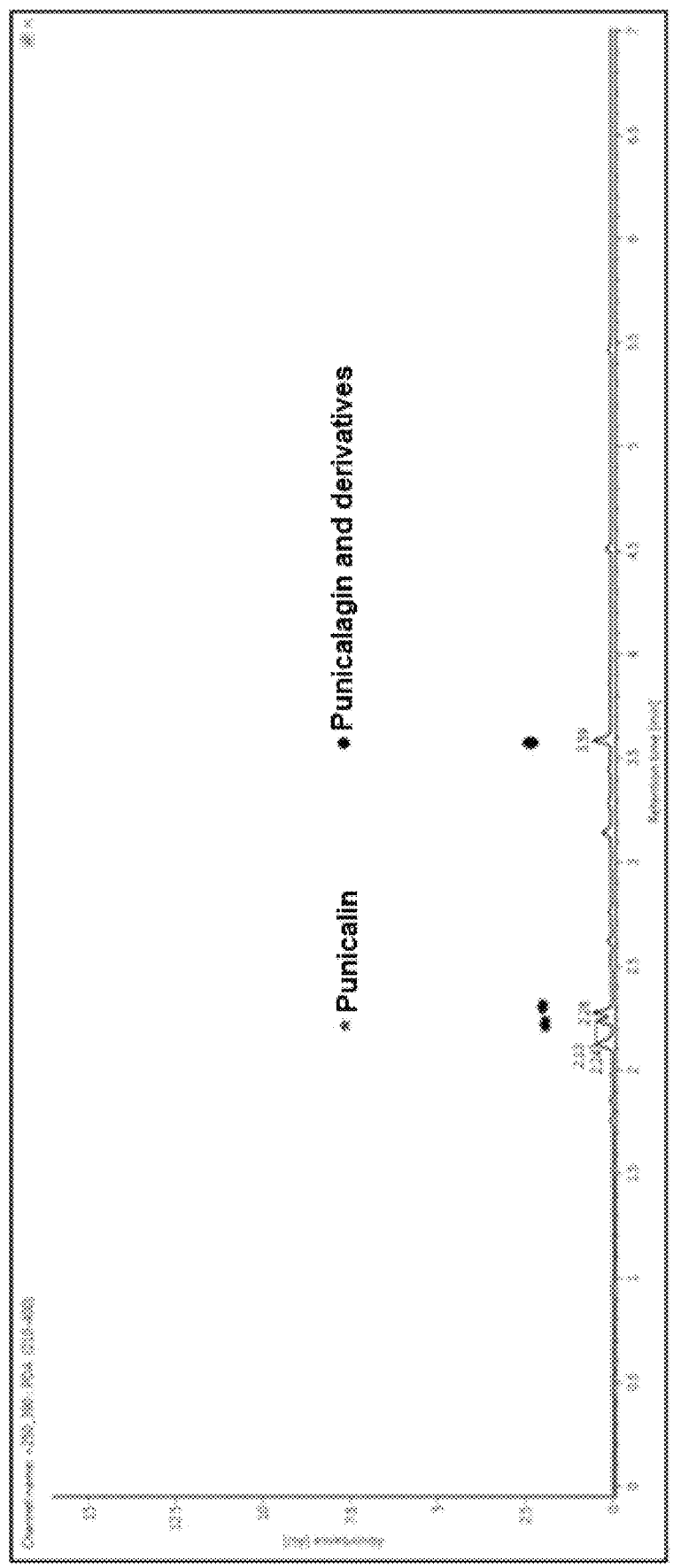
FIG. 3 shows the chromatographic profile for *Punica granatum* juice between 250 and 390 nm.

The chromatogram of the different extracts (immature fruit rinds, mature fruit rinds, mature fruit juices) are presented in FIGS. 1, 2, and 3, respectively.

It can be seen that the extract of immature pomegranate has a much greater richness and diversity in polyphenols than pomegranate juice or than the extract of mature pomegranate.

In addition, the antibacterial activity (C. acnes) of these three products was compared according to the method described later in the present application. The inhibition diameter is proportional to the antibacterial efficacy of the product tested.

The results are presented in Table 4.

TABLE 4

|   | Inhibition of growth of C. acnes (diameter in cm) |
| --- | --- |
| Pomegranate juice | 0 |
| Extract of mature pomegranate rind | 1.6 ± 0.1 |
| Extract of immature pomegranate rind | 1.9 ± 0.0 |

It can be seen that pomegranate juice is not capable of inhibiting bacterial growth of C. acnes, and also that extract of immature pomegranate exhibits stronger antibacterial activity than extract of mature pomegranate.

C. Comparison of Products Obtained by Aqueous Extraction Versus Ethanol Extraction The prior art points out the existence of ethanolic pomegranate extracts on the market.

Table 5 shows the results comparing an ethanolic extract and an aqueous extract. The ethanolic extract is obtained by dissolving pomegranate rind powder in a proportion of 50 g/l in absolute ethanol. It is compared to an aqueous extract obtained in a similar manner by dissolving pomegranate rind powder in a proportion of 50 g/l in distilled water.

TABLE 5

| Tests | Sum of the areas of the Ellagitannins (arb. unit) | % Ellagitannins vs Process Water |
| --- | --- | --- |
| Aqueous Extract | 13,287,229 | 100% |
| Ethanolic Extract | 3,072,755 | 23% |

It can be seen that the aqueous extract has a much higher content of Ellagitannin compounds than the ethanolic extract.

D. Comparison of the Active Ingredient According to the Invention to Punicalagin Alone The results concerning the antibacterial effect of the active ingredient according to the invention compared to those of punicalagin, the main compound of the polyphenols present in the fruit of the pomegranate, are presented in Table 6.

TABLE 6

| Inhibition diameter (cm) | Deposit 15 µl | Deposit 30 µl |
| --- | --- | --- |
| Hydrolysate of Example 1 according to the invention | 1.3 ± 0.1 | 1.8 ± 0.0 |

TABLE 6-continued

| Inhibition diameter (cm) | Deposit 15 µl | Deposit 30 µl |
| --- | --- | --- |
| Punicalagin at the same dose as in Ex 1 | 1.1 ± 0.1 | 1.4 ± 0.1 |

It can be seen that punicalagin has an antibacterial effect on the growth of C. acnes, but it should be noted above all that the hydrolysate of Example 1 according to the invention inhibits the growth of C. acnes more significantly than punicalagin at the same dose (+23%).

IV.B Examples of Cosmetic or Dermatological Compositions According to the Invention IV. B1. Example 4: Example of a Composition of a Purifying Lotion According to the Invention An example of a formulation containing an active ingredient according to the invention is presented in Table 7 below. This lotion is fresh and non-sticky and gently purifies the skin.

TABLE 7

|   | Ingredients | INCI name | % |
| --- | --- | --- | --- |
| A | Glycolic acid | Glycolic acid | 0.50 |
|   | Salicylic acid | Salicylic acid | 0.10 |
|   | Lactic acid 90% | Lactic acid & Aqua (water) | 0.90 |
|   | Hydrolite 6 | 1,2-Hexanediol | 1.00 |
|   | DUB DIOL | Methyl propanediol | 10.00 |
| B | Water | Aqua (water) | q.s. 100 |
|   | Soda 28% | Aqua (water) & Sodium hydroxide | 1.90 |
| C. | Dissolvine GL 47-S | Aqua (water) & Tetrasodium glutamate diacetate | 0.05 |
| D | Oramix CG 110 | Caprylyl/capryl glucoside & Aqua (water) | 0.50 |
| E | Active ingredient of Example 2 | Maltodextrin & Punica granatum extract | 0.50 |

It is obtained by carrying out the following procedure:
place A under magnetic stirring and heat to solubilization,
place B under moderate stirring,
add B to A in a trickle under magnetic stirring,
add C, then D and E under magnetic stirring and stir until clear.

IV. B2. Example 5: Example of Treatment Serum Composition According to the Invention An example of a formulation containing an active ingredient according to the invention is presented in Table 8 below. This light and smooth care product spreads easily and penetrates quickly, leaving the skin soft without a greasy or sticky sensation.

TABLE 8

|   | Ingredients | INCI name | % |
| --- | --- | --- | --- |
| A | Water | Aqua (Water) | 76.5 |
|   | Glycerin | Glycerin | 2.0 |
|   | Butylene Glycol | Butylene Glycol | 3.0 |
|   | Green Preservative | — | 1.0 |

TABLE 8-continued

| | Ingredients | INCI name | % |
|---|---|---|---|
| B | Emulium Delta MB[1] | Cetyl Alcohol & Glyceryl Stearate & PEG-75 Stearate & Ceteth-20 & Steareth-20 | 3.0 |
| | Jojoba Oil[2] | *Simmondsia chinensis* (Jojoba) Seed Oil | 2.0 |
| | DUB MCT 5545[3] | Caprylic/Capric Triglyceride | 4.0 |
| | DUB DIS[3] | Diisopropyl Sebacate | 4.0 |
| | Cetiol CC[4] | Dicaprylyl Carbonate | 3.0 |
| C. | Sepiplus 400[5] | Polyacrylate-13 & Polyisobutene & Polysorbate 20 & Sorbitan Isostearate & Aqua (Water) | 1.0 |
| D | Active ingredient of example 1 | Maltodextrin & *Punica granatum* Extract | 2.5 |
| | Water | Aqua (Water) | 2.0 |
| E | Citric Add Solution 10% | Aqua (Water) & Citric Acid | q.s. pH |

It is obtained by carrying out the following procedure:
place A under gentle stirring and heat to 80° C.,
place B under magnetic stirring and heat to 80° C.,
under rotor-stator, emulsify B in A for 5 min.,
at 40° C., under moderate stirring, add C then D,
adjust the pH between 4.5 and 5.0 with E.

IV. C. Demonstration of the Effect and Efficacy of an Active Ingredient According to the Invention on the Various Factors at the Origin of Acne The following studies make it possible to demonstrate all of the efficacies of the active ingredient according to the invention. It acts on the activity of the sebaceous gland, on the keratolytic activity, on inflammation, and on the controlling of *C. acnes*. All of these 4 routes of efficacy give it global and complete efficacy for acne.

IV.C1. Study of the Efficacy of the Active Ingredient According to the Invention on Changes in the Activity of the Sebaceous Gland Acne is a pathology that is characterized by quantitative and qualitative changes in the sebum. Indeed, under the influence of various endogenous factors (e.g., hormones, *Cutibacterium acnes*, lipophagic activity) and exogenous factors (e.g., stress), the metabolism of the sebaceous glands is activated. This results in an increase in sebogenesis and, consequently, in an abnormally high production of sebum. The following studies will show that the active ingredient according to the invention acts on the four parameters that influence the activity of the sebaceous gland.

A. Study of the Efficacy of the Active Ingredient According to the Invention on the Activity of the Sebaceous Gland Under Hormonal Influence.

The objective of this study was to evaluate the effect of an active ingredient according to the invention on the sebaceous component, the activity of which is modified by androgen hormones.

The activity of 5-alpha reductase was evaluated in vitro on primary human sebocytes (NHS). This enzyme catalyzes the conversion of testosterone into dihydrotestosterone (DHT).

The operating procedure for the culturing and treatment of human sebocytes for studying testosterone metabolism is as follows. Normal human sebocytes (NHS) are seeded in a specific culture medium and incubated at 37° C. Initially, the cells are then pretreated with the active ingredient of Example 2 at 0.0006% or 0.0015%. The following day, the cells are treated with a solution of radiolabeled testosterone containing or not containing the active ingredient of Example 2 at 0.0006% or 0.0015% for 24 hours. The culture supernatants are recovered.

Analysis of 5-Alpha Reductase Activity:

The steroids contained in the culture supernatants were extracted in a mixture of chloroform/methanol. The organic phase containing the steroids was collected and the different molecular species (testosterone metabolites) were separated by thin layer chromatography (TLC) using a dichloromethane/ethyl acetate/methanol mixture as the separation solvent. The development of the chromatography plates and the evaluation of the quantity of transformed testosterone were carried out by densitometric analysis of the various spots corresponding to the various metabolites of testosterone.

The results concerning the activity of 5-alpha reductase are presented in Table 9 (Mean values of the conversion of testosterone into DHT by 5-alpha reductase by the differentiated NHSs).

TABLE 9

| | Differentiated NHSs | | |
|---|---|---|---|
| 5-alpha reductase activity | Control | Invention (Ex 2) 0.0006% | Invention (Ex 2) 0.0015% |
| Mean (arb. unit) | 54 | 39 | 34 |
| Standard deviation | 12 | 13 | 14 |
| Variation in 5-alpha testosterone activity/Control | | −28% | −37% |

When tested at 0.0015% on differentiated NHSs, the active ingredient according to the invention significantly limits the conversion of testosterone to DHT by 37%. The active ingredient according to the invention therefore regulates the biology of the sebocytes and thus limits the excess of androgens involved in the physiology of acne.

B. Study of the Efficacy of the Active Ingredient According to the Invention on the Activity of the Sebaceous Gland Under the Influence of Substance P and/or of *C. acnes*.

The objective of this study is to evaluate in vitro the effect of the active ingredient according to the invention on sebogenesis through the analysis of the secretion of lipid droplets by NHSs subjected to stress by substance P and/or *C. acnes*.

The operating procedure for the culturing and treatment of human sebocytes for studying sebogenesis is described below. Normal human sebocytes (NHS) are seeded in a specific culture medium and incubated at 37° C. The cells are then treated with a suspension of *C. acnes* in the presence or absence of substance P for 24 hours. The active ingredient of Example 2 is applied at 0.0006% or 0.0015% together with the *C. acnes*+/−Substance P treatment. Finally, the cells are rinsed with PBS buffer and then fixed.

To stain the lipid droplets, cells are fixed in paraformaldehyde and then the BODIPY™ probe, which stains neutral lipids, is used. The nuclei are labeled.

The results concerning sebogenesis are presented in Table 10 (Mean values of the staining of the lipids of NHSs treated with *C. acnes* using the BODIPY™ probe).

TABLE 10

|  | Untreated NHSs Control | Control | NHSs treated with *C. acnes* | |
|---|---|---|---|---|
| Staining of lipids |  |  | Invention (Ex 2) 0.0006% | Invention (Ex 2) 0.0015% |
| Mean (arb. unit) | 23.3 | 95.4 | 65.6 | 50.8 |
| Standard deviation | 7.9 | 19.4 | 23.8 | 18.9 |
| Variation in the coloration of the lipids/Control NHSs treated with *C. acnes* |  |  | −41% | −62% |

The results concerning sebogenesis are presented in Table 11 (Mean values of the staining of the lipids of NHSs treated with substance P. using the BODIPY™ probe).

TABLE 11

|  | Untreated NHSs Control | Control | NHSs treated with Substance P | |
|---|---|---|---|---|
| Staining of lipids |  |  | Invention (Ex 2) 0.0006% | Invention (Ex 2) 0.0015% |
| Mean (arb. unit) | 17.9 | 104.1 | 64.1 | 26.8 |
| Standard deviation | 4.4 | 16.8 | 21.5 | 5.8 |
| Variation in the coloration of the lipids/Control NHSs treated with Substance P |  |  | −46% | −87% |

The results concerning sebogenesis are presented in Table 12 (Mean values of the staining of the lipids of NHSs treated with *C. acnes*+Substance P using the BODIPY™ probe).

TABLE 12

|  | Untreated NHSs Control | Control | NHSs treated with *C. acnes* + Substance P | |
|---|---|---|---|---|
| Staining of lipids |  |  | Invention (Ex 2) 0.0006% | Invention (Ex 2) 0.0015% |
| Mean (arb. unit) | 23.3 | 143.3 | 75.3 | 56.3 |
| Standard deviation | 7.9 | 38.0 | 33.7 | 29.0 |
| Variation in the coloration of lipids/NHSs treated with *C. acnes* + substance P |  |  | −57% | −73% |

It can be seen that, when tested at 0.0015% on NHSs treated with *C. acnes*+/−Substance P, the active ingredient according to the invention significantly inhibits the secretion of lipid droplets induced by *C. acnes* by 62%, by substance P by 87%, and by the combination of *C. acnes* and substance P by 73%.

In response to *C. acnes* and/or substance P, the active ingredient according to the invention thus limits the excess secretion of lipids, a characteristic parameter of the physiopathology of acne.

C. Study of the Efficacy of the Active Ingredient According to the Invention on the Lipophagy of the Sebaceous Gland.

During dysfunction of the sebocytes, research papers have shown that morphological and functional changes appear at the level of the lipophagy of the sebocytes. The involvement of lipophagy was studied through the simultaneous analysis of the Light Chain 3 (LC3b) marker and the secretion of lipid droplets by NHSs stimulated by a differentiation cocktail.

The operating procedure for the culturing and treatment of human sebocytes for studying lipophagy is described below. Normal human sebocytes (NHS) are seeded in a specific culture medium and incubated at 37° C. in an atmosphere containing 5% $CO_2$. The cells are treated with a solution of linoleic acid and testosterone for 24 hours. Six hours after commencement of the treatment, the active ingredient of Example 2 is added at 0.0006% or 0.0015%. The cells are then rinsed with PBS buffer and then fixed.

For the immunocytological analysis of LC3b, the cells are fixed in methanol. The primary antibody is used. The nuclei are labeled using 4',6-diamidino-2-phenylindole. Viewing is performed using a microscope coupled to an image analysis system. The coloration and the synthesis of the various markers studied are proportional to the intensity of the fluorescence (yellow or green color) present in the NHSs.

The results concerning lipophagy are presented in Table 13 (Mean values of the synthesis of LC3b by the differentiated NHSs) and in Table 14 (Mean values of the staining of the lipids of the differentiated NHSs using the BODIPY™ probe).

TABLE 13

|  | Undifferentiated NHSs Control | Control | Differentiated NHSs | |
|---|---|---|---|---|
| Synthesis of LC3b |  |  | Invention (Ex 2) 0.0006% | Invention (Ex 2) 0.0015% |
| Mean (arb. unit) | 15.9 | 6.7 | 14.9 | 17.8 |
| Standard deviation | 4.8 | 4.7 | 7.5 | 6.1 |
| Variation in the synthesis of LC3b/Control differentiated NHSs |  |  | +89% | +121% |

TABLE 14

|  | Undifferentiated NHSs Control | Control | Differentiated NHSs | |
|---|---|---|---|---|
| Lipid secretion |  |  | Invention (Ex 2) 0.0006% | Invention (Ex 2) 0.0015% |
| Mean (arb. unit) | 16.6 | 321.2 | 133.8 | 85.5 |
| Standard deviation | 19.2 | 159.6 | 35.1 | 38.2 |
| Variation in lipid secretion/Control differentiated NHSs |  |  | −62% | −77% |

It can be seen that, when tested at 0.0015% on differentiated NHSs, sebocytes exhibiting lipophagy failure and increased lipogenesis, the active ingredient according to the invention significantly increases the synthesis of LC3b by 121% and significantly inhibits the secretion of lipid droplets of 77%. By restoring the lipophagy mechanism in differentiated human sebocytes, ACNESIUM®) limits the production of lipids, a characteristic component of the physiopathology of acne.

IV.C2. Study of the Efficacy of the Active Ingredient According to the Invention on Hyperkeratinization A. Study.

As described previously in part C2, hyperkeratinization is an early biological event in the development of acne lesions. It is characterized by abnormal proliferation and keratinization of follicular keratinocytes which promotes obstruction of the excretory duct, poor evacuation of sebum, and consecutively dilation of the pilosebaceous duct, resulting in the formation of a microcomedone.

The objective of this study was to evaluate the effect of an active ingredient according to the invention on hyperkeratinization. Hyperkeratinization was assessed by measuring the thickness of the stratum corneum and by studying the synthesis of cytokeratins CK-5 and CK-16 in a model mimicking acne-prone skin (called SILABSKIN® RE mimic acne).

The operating procedure for the culturing and treatment of SILABSKIN® RE mimic acne is presented below. Normal human keratinocytes are seeded in inserts in a specific culture medium and incubated at 37° C. The SILABSKIN® RE are passed through an air/liquid interface, and then the culture medium is changed every 2 days. The SILABSKIN® RE are then treated topically with a suspension of *C. acnes*, and the active ingredient of Example 2 is applied topically at 0.003% and 0.006% together with the application of *C. acnes*. After 2 hours, the excess bacterial solution is aspirated.

The next day, the SILABSKIN® RE are again treated topically with a suspension of *C. acnes*, and the active ingredient of Example 2 is applied topically at 0.003% and 0.006% together with the application of *C. acnes*. After 2 hours, the excess bacterial solution is aspirated. The SILABSKIN® RE are finally treated topically with a solution of squalene peroxide. Finally, the culture subnatants are recovered and stored at −80° C., and the tissues are recovered and fixed in paraformaldehyde. After fixation, the SILABSKIN® RE are dehydrated and embedded in paraffin. Sections are made using a microtome.

Hematoxylin/eosin staining is performed. Immunohistological analyses of cytokeratins-5 and -16 were performed after incubation with the primary antibodies, followed by incubation with the secondary antibody. The nuclei are labeled using 4′,6-diamidino-2-phenylindole. Viewing is performed using a microscope coupled to an image analysis system. The synthesis of the various markers studied is proportional to the intensity of the (green) fluorescence present on the reconstructed epidermises. A quantitative analysis of the images was performed using Matlab software.

The results are presented in Table 15 (mean values of the thickness of the stratum corneum of the SILABSKIN® RE mimic acne), Table 16 (mean values of the synthesis of cytokeratin-5 by SILABSKIN® RE mimic acne), and Table 17 (mean values of the synthesis of cytokeratin-16 by SILABSKIN® RE mimic acne).

TABLE 15

| | | SILABSKIN ® RE mimic acne | | |
|---|---|---|---|---|
| | SILABSKIN ® RE Control | Control | Invention (Ex 2) 0.003% | Invention (Ex 2) 0.006% |
| Stratum corneum/total thickness (%) | 24.0 | 30.6 | 25.5 | 24.0 |
| Standard deviation | 1.8 | 5.6 | 4.4 | 3.9 |
| Variation in the thickness of the stratum corneum | | | −77% | −100% |

In the 3D reconstructed epidermis model mimicking acne-prone ski, the stratum corneum is thicker than in the control model, indicating hyperkeratinization.

It can be seen that, when applied topically at 0.006% to SILABSKIN® RE mimic acne, the active ingredient according to the invention significantly renormalizes the thickness of the stratum corneum by 100%.

TABLE 16

| | | | SILABSKIN ® RE mimic acne | |
|---|---|---|---|---|
| Synthesis of cytokeratin-5 | SILABSKIN ® RE Control | Control | Invention (Ex 2) 0.003% | Invention (Ex 2) 0.006% |
| Mean (arb. unit) | 9.0 | 15.0 | 11.6 | 9.9 |
| Standard deviation | 2.9 | 1.7 | 4.0 | 2.5 |
| Variation in the synthesis of cytokeratin-5/Control SILABSKIN ® RE mimic acne | | | −57% | −85% |

TABLE 17

| | | | SILABSKIN ® RE mimic acne | |
|---|---|---|---|---|
| Synthesis of cytokeratin-16 | Control | Control | Invention (Ex 2) 0.003% | Invention (Ex 2) 0.006% |
| Mean (arb. unit) | 8.6 | 29.8 | 12.7 | 10.2 |
| Standard deviation | 3.7 | 18.6 | 7.5 | 6.8 |
| Variation in the synthesis of cytokeratin-16/SILABSKIN ® RE mimic acne | | | −81% | −92% |

In the 3D model of reconstructed epidermis mimicking acne-prone skin, cytokeratins-5 and -16 are found in greater quantities than in the control reconstructed epidermis.

It can be seen that, when applied topically at 0.006% on SILABSKIN® RE mimic acne, the active ingredient according to the invention significantly reduces the synthesis of cytokeratins-5 and 16 by 85% and 92%, respectively, thus limiting hyperkeratinization, the major epidermal alteration appearing during acne.

B. Effect of an Active Ingredient According to the Invention on the Genes of the Mechanical Epidermal Barrier.

The study aims to evaluate the effect of the active ingredient according to the invention on its ability to modify the expression of the genes of the epidermal mechanical barrier filaggrin, loricrin, claudin-4, GBA: β-glucosylceramidase, ABCA12.

This study was carried out on normal human keratinocytes by quantitative PCR. The operating procedure of the study is described below. Normal human keratinocytes are seeded and then incubated at 37° C. in an autoclave containing 5% CO2. The culture medium is then removed and replaced with medium containing the active ingredient according to the invention.

The cells are then incubated at 37° C. in an atmosphere containing 5% CO2. The cells are recovered and the total RNA extracted for the purpose of studying filaggrin, loricrin, claudin-4, GBA, and ABCA12. The RNAs were reverse-transcribed, and the complementary DNAs obtained were analyzed by the quantitative PCR technique.

The mRNAs of reference controls were also analyzed in parallel with the mRNAs of filaggrin, claudin-4, GBA, and ABCA12. The quantification of the incorporation of fluorescence (SYBR Green) is measured continuously using a thermal cycler. The RQ (relative quantification) analysis is performed using software.

The results are presented in Tables 33 and 34 below.

TABLE 33

| | Filaggrin expression (%) | Ability to induce filaggrin expression (%) | Loricrin expression (%) | Ability to induce loricrin expression (%) | Claudin-4 expression (%) | Ability to induce claudin-4 expression (%) |
|---|---|---|---|---|---|---|
| Control | 100 | | 100 | | 100 | |
| Invention (Ex 2) 0.05% | 130 | 30 | 72 | 0 | 16 | 0 |

TABLE 34

| | ABCA12 expression (%) | Ability to induce ABCA12 expression (%) | GBA expression (%) | Ability to induce GBA expression (%) |
|---|---|---|---|---|
| Control | 100 | | 100 | |
| Invention (Ex 2) 0.05% | 79 | 0 | 20 | 0 |

When tested at 0.05%, the active ingredient according to the invention induces the expression of the mRNAs encoding for filaggrin and does not induce the expression of the mRNAs encoding for Loricrine, Claudine-4, ABCA12, and GBA.

IV.C3. Study of the Efficacy of the Active Ingredient According to the Invention on Inflammation As described previously in part C3, inflammation is the biological phenomenon concomitant with all of the stages of the formation of acne lesions: microcomedone, comedone, inflammatory lesion, post-inflammatory erythema, and even scarring. The bacterium C. acnes stimulates the production of pro-inflammatory mediators by several cell types of the pilosebaceous unit (keratinocytes, sebocytes, immune cells infiltrating acne lesions).

The objective of these studies was to evaluate the effect of an active ingredient according to the invention on keratinocyte inflammation, sebocyte inflammation, and on the biology of Th17 lymphocytes.

A. Study of the Efficacy of the Active Ingredient According to the Invention on Keratinocyte Inflammation.

Keratinocyte inflammation was studied on a 3D model mimicking acne-prone skin (called SILABSKIN® RE mimic acne) by measuring different inflammation mediators that are found in large quantities in acne-prone skin: CCL5, CCL20, CXCL1, IL-1α, IL-8, MMP2, and MMP9.

The operating procedure for the culturing and treatment of SILABSKIN® RE mimic acne is described below. Normal human keratinocytes are seeded in inserts in a specific culture medium and incubated at 37° C. The SILABSKIN® RE are passed through an air/liquid interface, and then the culture medium is changed every 2 days. The SILABSKIN® RE are then treated topically with a suspension of C. acnes, and the active ingredient according to the invention is applied topically at 0.003% and 0.006% together with the application of C. acnes.

After 2 hours, the excess bacterial solution is aspirated. The next day, the SILABSKIN® RE are again topically treated with a suspension of C. acnes, and the active ingredient according to the invention is applied topically at 0.003% and 0.006% together with the application of C. acnes. After 2 hours, the excess bacterial solution is aspirated. The SILABSKIN® RE are finally treated topically with a solution of squalene peroxide. The SILABSKIN® RE culture subnatants are recovered and stored at −80° C.

The secretion of inflammatory mediators (CCL5, CCL20, CXCL1, IL-1α, IL-8, MMP2, and MMP9) by SILABSKIN® RE mimic acne was evaluated using the multiplex technique (LEGENDPlex™). The results are acquired using a flow cytometer. The analysis is performed using LEGENDplex™ Data Analysis Software.

The results concerning the secretion of CCL5, CCL20, and CXCL1 are presented in Table 18 (Mean values of the synthesis of CCL5 by SILABSKIN® RE mimic acne), in Table 19 (Mean values of the synthesis of CCL20 by SILABSKIN® RE mimic acne), and in Table 20 (Mean values of the synthesis of CXCL1 by SILABSKIN® RE mimic acne).

TABLE 18

| | | SILABSKIN ® RE mimic acne | | |
|---|---|---|---|---|
| Synthesis of CCL5 | SILABSKIN ® RE Control | Control | Invention (Ex 2) 0.003% | Invention (Ex 2) 0.006% |
| Mean (pg/ml) | 30 | 47 | 36 | 30 |
| Standard deviation | 14 | 17 | 6 | 10 |
| Variation in CCL5 synthesis | | | −65% | −100% |

TABLE 19

| Synthesis of CCL20 | SILABSKIN® RE Control | SILABSKIN® RE mimic acne | | |
|---|---|---|---|---|
| | | Control | Invention (Ex 2) 0.003% | Invention (Ex 2) 0.006% |
| Mean (pg/ml) | 36 | 119 | 74 | 54 |
| Standard deviation | 18 | 46 | 49 | 23 |
| Variation in CCL20 synthesis | | | −54% | −78% |

TABLE 20

| CXCL1 Synthesis | SILABSKIN® RE Control | SILABSKIN® RE mimic acne | | |
|---|---|---|---|---|
| | | Control | Invention (Ex 2) 0.003% | Invention (Ex 2) 0.006% |
| Mean (pg/ml) | 480 | 749 | 553 | 495 |
| Standard deviation | 120 | 230 | 160 | 109 |
| Variation in CXCL1 synthesis | | | −73% | −94% |

In the 3D model of reconstructed epidermis mimicking acne-prone skin, the synthesis of chemokines, the mediators responsible for the attraction of immune cells, is increased.

It can be seen that, when tested at 0.006% on SILABSKIN® RE mimic acne, the active ingredient according to the invention significantly inhibits the secretion of CCL5, CCL20, and CXCL1 by 100%, 78%, and 94%, respectively. The active ingredient according to the invention regulates the biology of the acne-prone epidermis and thus limits inflammation, an important marker of the physiopathology of acne.

The results concerning cytokine synthesis are presented in Table 21 (Mean values of IL-1α synthesis by SILABSKIN® RE mimic acne) and in Table 22 (Mean values of IL-8 synthesis by SILABSKIN® RE mimic acne).

TABLE 21

| IL-1α synthesis | SILABSKIN® RE Control | SILABSKIN® RE mimic acne | | |
|---|---|---|---|---|
| | | Control | Invention (Ex 2) 0.003% | Invention (Ex 2) 0.006% |
| Mean (pg/ml) | 39 | 78 | 49 | 43 |
| Standard deviation | 5 | 18 | 17 | 17 |
| Variation in IL-1α synthesis | | | −74% | −90% |

TABLE 22

| Synthesis of IL-8 | SILABSKIN® RE Control | SILABSKIN® RE mimic acne | | |
|---|---|---|---|---|
| | | Control | Invention (Ex 2) 0.003% | Invention (Ex 2) 0.006% |
| Mean (pg/ml) | 271 | 601 | 381 | 310 |
| Standard deviation | 168 | 112 | 190 | 143 |
| Variation in IL-8 synthesis | | | −67% | −88% |

In the 3D model of reconstructed epidermis mimicking acne-prone skin, the synthesis of the pro-inflammatory cytokines characteristic of acne-prone skin is increased.

It can be seen that, when tested at 0.006% on SILABSKIN® RE mimic acne, the active ingredient according to the invention significantly inhibits the secretion of IL-1α and IL-8 by 90% and 88%, respectively.

The results concerning the synthesis of matrix metalloproteinases are presented in Table 23 (Mean values of the synthesis of MMP2 by SILABSKIN® RE mimic acne) and in Table 24 (Mean values of the synthesis of MMP9 by SILABSKIN® RE mimic acne).

TABLE 23

| Synthesis of MMP2 | SILABSKIN® RE Control | SILABSKIN® RE mimic acne | | |
|---|---|---|---|---|
| | | Control | Invention (Ex 2) 0.003% | Invention (Ex 2) 0.006% |
| Mean (pg/ml) | 674 | 1013 | 614 | 541 |
| Standard deviation | 295 | 258 | 352 | 283 |
| Variation in MMP2 synthesis | | | −118% | −139% |

TABLE 24

| Synthesis of MMP9 | SILABSKIN® RE Control | SILABSKIN® RE mimic acne | | |
|---|---|---|---|---|
| | | Control | Invention (Ex 2) 0.003% | Invention (Ex 2) 0.006% |
| Mean (ng/ml) | 102 | 181 | 142 | 106 |
| Standard deviation | 42 | 61 | 19 | 36 |
| Variation in MMP9 synthesis/ SILABSKIN® RE mimic acne | | | −49% | −95% |

In the 3D model of reconstructed epidermis mimicking acne-prone skin, the synthesis of matrix metalloproteinases contributing to the extension of the inflammatory phenomenon in acne lesions is increased.

It can be seen that, when tested at 0.006% on SILABSKIN® RE mimic acne, the active ingredient according to the invention significantly inhibits the secretion of MMP2 and MMP9 by 139% and 95%, respectively.

All of these studies demonstrate the ability of the active ingredient according to the invention to limit keratinocyte inflammation.

B. Study of the Efficacy of the Active Ingredient According to the Invention on the Th17 Inflammatory Response.

An infiltrate of immune cells is present in acne lesions and is composed mainly of CD4+ helper T lymphocytes. These cells have a Th17 profile, which suggests that acne is a pathology in which Th17 lymphocytes contribute significantly to the inflammatory phenomenon.

The effect of the active ingredient according to the invention on the Th17 inflammatory response was evaluated. This study concerns the analysis of the secretion of IL-17 produced by Th17 lymphocytes, cells which are found in large numbers in the lesional regions of acne.

The operating procedure for the culturing and treatment of Th17 lymphocytes is described below. Naive T lymphocytes (LT) are isolated from peripheral blood mononuclear cells. They are seeded in plates precoated with an anti-CD3 antibody containing specific medium. A mix enabling the differentiation of naive LT into LTh17 is added. The cells are then incubated at 37° C. After several days, the culture medium is removed and replaced with a medium containing the differentiation mix in the presence or absence of the active ingredient according to the invention (0.0015% or 0.0060%). The following day, the cell culture supernatants are recovered and stored at −80° C.

IL-17 secretion was evaluated using the ELISA technique. The results concerning the effect on Th17 lymphocytes are shown in Table 25 (Mean values of IL-17 secretion by Th17 lymphocytes).

TABLE 25

| IL-17 secretion | Th17 lymphocytes | | |
|---|---|---|---|
| | Control | Invention (Ex 2) 0.0015% | Invention (Ex 2) 0.0060% |
| Mean (pg/ml) | 1,538 | 1,118 | 949 |
| Standard deviation | 389 | 362 | 330 |
| Variation in IL-17 secretion | | −27% | −38% |

It can be seen that, when tested at 0.0060% on Th17 lymphocytes, the active ingredient according to the invention significantly inhibits the secretion of IL-17 by 38%. The active ingredient according to the invention regulates the biology of LTh17 and thus limits the inflammation induced by these cells, which are important actors in the physiopathology of acne.

C. Study of the Efficacy of the Active Ingredient According to the Invention on Sebocyte Inflammation.

*C. acnes* induces an inflammatory response in sebocytes. The latter then produce numerous mediators (IL-6, IL-8, etc.) which contribute to the inflammatory reaction observed in acne lesions. What is more, the pathogenic role of substance P as a neuromediator of inflammation in acne is currently well described in the literature.

Sebocyte inflammation was studied by analyzing the secretion of IL-6 and IL-8 by sebocytes subjected to bacterial exposure (*C. acnes* phylotype IA1) and neuronal influence (substance P).

The operating procedure for the culturing and treatment of human sebocytes is described below. Normal human sebocytes (NHS) are seeded in a specific culture medium and incubated at 37° C. in an atmosphere containing 5% $CO_2$. The cells are treated with a suspension of *C. acnes* and/or substance P, and the active ingredient according to the invention is applied at 0.0006% or 0.0015% together with the *C. acnes*+/−Substance P treatment. The culture supernatants are then recovered and stored at −80° C.

The secretion of IL-17, IL-6, IL-8 was evaluated using the ELISA technique. The results concerning the effect on sebocyte inflammation are shown:

- in Table 25 (synthesis of IL-6 by sebocytes treated with *C. acnes*),
- in Table 26 (synthesis of IL-8 by sebocytes treated with *C. acnes*),
- in Table 27 (synthesis of IL-6 by sebocytes treated with substance P),
- in Table 28 (synthesis of IL-9 by sebocytes treated with substance P),
- in Table 29 (synthesis of IL-6 by sebocytes treated with *C. acnes*+Substance P),
- and in Table 30 (synthesis of IL-8 by sebocytes treated with *C. acnes*+Substance P).

TABLE 26

| | NHSs treated with *C. acnes* | | | |
|---|---|---|---|---|
| Synthesis of IL-6 | Untreated NHSs Control | Control | Invention (Ex 2) 0.0006% | Invention (Ex 2) 0.0015% |
| Mean (pg/ml) | 109 | 246 | 158 | 97 |
| Standard deviation | 71 | 99 | 45 | 36 |
| Variation in IL-6 synthesis | | | −64% | −109% |

TABLE 27

| | NHSs treated with *C. acnes* | | | |
|---|---|---|---|---|
| Synthesis of IL-8 | Untreated NHSs Control | Control | Invention (Ex 2) 0.0006% | Invention (Ex 2) 0.0015% |
| Mean (pg/ml) | 145 | 349 | 194 | 91 |
| Standard deviation | 72 | 116 | 48 | 49 |
| Variation in IL-8 synthesis/Control NHSs treated with *C. acnes* *C. acnes* | | | −76% | −126% |

Treatment with *C. acnes* stimulates inflammation in normal human sebocytes. When tested at 0.0015%, the active ingredient according to the invention significantly inhibits the secretion of IL-6 and IL-8 by human sebocytes by 109% and 126%, respectively.

TABLE 28

| | NHSs treated with Substance P | | | |
|---|---|---|---|---|
| Synthesis of IL-6 | Untreated NHSs Control | Control | Invention (Ex 2) 0.0006% | Invention (Ex 2) 0.0015% |
| Mean (pg/ml) | 132 | 198 | 112 | 75 |
| Standard deviation | | | | |
| Variation in IL-6 synthesis/Control NHSs treated with substance P | | | −130% | −186% |

TABLE 29

| | NHSs treated with Substance P | | | |
|---|---|---|---|---|
| Synthesis of IL-8 | Untreated NHSs Control | Control | Invention (Ex 1) 0.0006% | Invention (Ex 1) 0.0015% |
| Mean (pg/ml) | 166 | 244 | 143 | 91 |
| Standard deviation | | | | |
| Variation in IL-8 synthesis/Control NHSs treated with Substance P | | | −130% | −196% |

Treatment with substance, a stress neuromediator, stimulates inflammation in normal human sebocytes.

It can be seen that, when tested at 0.0015% on sebocytes treated with substance P, the active ingredient according to the invention significantly inhibits the secretion of IL-6 and IL-8 by 186% and 196%, respectively.

TABLE 30

| Synthesis of IL-6 | Untreated NHSs Control | Control | Invention (Ex 2) 0.0006% | Invention (Ex 2) 0.0015% |
|---|---|---|---|---|
| Mean (pg/ml) | 109 | 394 | 258 | 193 |
| Standard deviation | 71 | 108 | 73 | 32 |
| Variation in IL-6 synthesis/Control NHSs treated with C. acnes + substance P | | | −48% | −71% |

NHSs treated with C. acnes + Substance P

TABLE 31

| Synthesis of IL-8 | Untreated NHSs Control | Control | Invention (Ex 2) 0.0006% | Invention (Ex 2) 0.0015% |
|---|---|---|---|---|
| Mean (pg/ml) | 145 | 539 | 220 | 192 |
| Standard deviation | 72 | 120 | 36 | 46 |
| Shapiro-Wilks | 0.081 | 0.105 | 0.374 | 0.115 |
| Variation in IL-8 synthesis/Control NHSs treated with C. acnes + Substance P C. acnes | | | −81% | −88% |

NHSs treated with C. acnes + Substance P

Combined treatment with C. acnes and substance P exacerbates inflammation in normal human sebocytes.

When tested at 0.0015% on sebocytes treated with C. acnes+Substance P, the active ingredient according to the invention significantly inhibits the secretion of IL-6 and IL-8 by 71% and 88%, respectively. All of these studies demonstrate the ability of the active ingredient according to the invention to regulate the sebocyte inflammation that is characteristic of the physiology of acne. These effects have been demonstrated in the presence of the key pathogen of the pathology, C. acnes, but also under conditions mimicking psychological stress.

IV.C4. Study of the Efficacy of the Active Ingredient According to the Invention on Change in the Microbiota As described previously in part C4, the bacterium C. acnes is considered to be one of the major pathogenic factors contributing to the development of acne. Acne is characterized by a loss of phylotypic diversity of C. acnes in favor of the IA1 phylotype. In addition, the population of C. acnes phylotype IA1 has an ability to communicate and organize itself to put in place virulence factors (formation of biofilms) via the quorum sensing system and thus colonize the follicle.

The objective of these studies is to show the effect of the active ingredient on the growth of the bacterium C. acnes, on the recruitment of bacteria by quorum sensing, and on the formation of a biofilm of C. acnes.

A. Study of the Efficacy of the Active Ingredient According to the Invention on Bacterial Growth.

The objective of this study was to evaluate the direct antibacterial effect of the active ingredient on the growth of C. acnes.

The operating procedure for culturing the bacterial strain is as follows:

C. acnes is cultured under anaerobic conditions at 37° C. on blood agar in suitable broths. To measure the minimum inhibitory concentration (MIC) of the active ingredient according to the invention, C. acnes was seeded in the absence and in the presence of the active ingredient according to the invention at different concentrations. The growth was evaluated by measuring the optical density at 600 nm. An exponential decay curve was plotted and modeled according to the equation $DO=DOmax \times e-d \cdot c$ (c=concentration of the active ingredient, d=factor deduced from the experimental data). The MIC50 is deduced from that and represents the minimum concentration of the active ingredient by which the growth of C. acnes is reduced by 50%.

The results concerning the growth of C. acnes phylotype IA1 are presented in Table 36.

TABLE 36

| Concentration of active ingredient according to the invention | Average growth of C. acnes phylotype IA1 |
|---|---|
| 0% | 0.748 |
| 0.0006% | 0.744 |
| 0.003% | 0.740 |
| 0.006% | 0.629 |
| 0.014% | 0.571 |
| 0.029% | 0.509 |
| 0.043% | 0.383 |
| 0.06% | 0.276 |
| 0.09% | 0.159 |
| 0.11% | 0.111 |
| 0.14% | 0.095 |
| 0.17% | 0.064 |
| 0.29% | 0.048 |
| 0.57% | 0.032 |

The higher the concentration of the active ingredient according to the invention, the more the growth of the C. acnes strain is inhibited. The minimum inhibitory concentration (MIC) making it possible to inhibit 50% of the growth is 0.043% of the active ingredient according to the invention. The active ingredient according to the invention has a bacteriostatic effect of at least 50% on the growth of C. acnes phylotype IA1 starting from a concentration of 0.043%.

B. Study of the Efficacy of the Active Ingredient According to the Invention on Quorum Sensing.

The population of C. acnes phylotype IA1 has an ability to communicate and organize itself to implement virulence factors via the quorum sensing system. The effect of the active ingredient according to the invention on quorum sensing was determined by measuring the expression of the Lux gene, a pivot gene whose level of activity is linked to that of QS.

A culture of C. acnes is seeded in specific broth in the presence and in the absence of the active ingredient according to the invention (0.006%) from a preculture in the exponential phase of growth. This culture is carried out at 37° C. under anaerobic conditions for 24 hours and is monitored by optical density measurement at 600 nm. After 24 hours of growth, the cultures are centrifuged:

The bacterial pellets are incubated and washed in RNA-protect Bacteria Reagent RNA Protect according to the supplier's recommendations. They are then kept dry at −80° C. for the extraction of the total RNAs.

The culture supernatants are sampled, filtered (0.2 μm), and stored at −20° C. in order to measure the quantity of AI-2 secreted during growth.

The results concerning the expression of LuxS and the synthesis of the AI-2 autoinducer are presented in Tables 37 and 38.

TABLE 37

| Expression of LuxS by C. acnes | Control | Active ingredient according to the invention at 0.006% |
|---|---|---|
| Mean | −1.07 | −1.50 |
| Standard Deviation | 0.34 | 0.10 |
| Variation in the expression of LuxS/Control | | −26% |

When tested at 0.006% on C. acnes, the active ingredient according to the invention limits the expression of LuxS, a major quorum sensing gene, by 26%.

TABLE 38

| Synthesis of AI-2 autoinducer | Control | Active ingredient according to the invention at 0.006% |
|---|---|---|
| Mean (ng/ml) | 831 | 690 |
| Standard Deviation | | |
| Variation in AI-2 synthesis/Control | | −17% |

When tested at 0.006% on C. acnes, the active ingredient according to the invention significantly limits the secretion of AI-2 by 17%.

All of these data demonstrate the ability of the active ingredient to reduce the quorum sensing activity of C. acnes.

C. Study of the Efficacy of the Active Ingredient According to the Invention on the Formation of Biofilm To assess the ability of the active ingredient according to the invention to limit C. acnes biofilm, the bacterium is seeded from a preculture in the exponential phase in the presence or absence of a sub-inhibitory quantity of the active ingredient according to the invention (0.006%) in microplates. The microplates are incubated in anaerobiosis at 37° C. for 48 hours in order to promote the formation of the biofilm.

After 48 hours, the wells of the microplate are emptied by aspiration and the non-adherent bacteria are eliminated. The biofilm is then stained with crystal violet. The crystal violet is quantified by spectrophotometric measurement at 540 nm. The quantity of biofilm formed is proportional to the crystal violet dosed in the well.

The results concerning the biofilms of C. acnes phylotype IA1 are presented in Table 39.

TABLE 39

| | Control | Active ingredient according to the invention at 0.006% |
|---|---|---|
| Average C. acnes Biofilms (DO at 540 nm) | 1.035 | 0.586 |
| Standard Deviation | 0.511 | 0.386 |
| Anti-Biofilm Activity/Control | | −43% |

At the sub-inhibitory concentration (0.006%), the active ingredient according to the invention significantly prevents the formation of a biofilm by C. acnes phylotype IA1 by 43%.

By limiting the growth and the formation of biofilm of C. acnes, the active ingredient according to the invention exerts an antibacterial activity against the virulent phylotype associated with the development of acne lesions.

IV.D. Demonstration of the Effect and Efficacy of an Active Ingredient According to the Invention on Acne-Prone Skin It has been previously demonstrated that, by virtue of a novel approach, the active ingredient according to the invention is capable of targeting the four major components of the physiopathology of acne. Tests have also been performed to clinically demonstrate the therapeutic efficacy on adult volunteers with mild to moderate acne, including the impact thereof on the lipidome of acne-prone skin.

Previous work has demonstrated that there is a variation in the lipidome between skin with acne lesions and healthy skin. The lipid profile of acne-prone skin has particularities, namely:
  the formation of large quantities of pro-inflammatory free fatty acids due to the hydrolysis of triglycerides by bacterial lipase (oleic acid, palmitic acid);
  a change in the saturation/unsaturation profile of fatty acids in favor of unsaturated FAs (increase in unsaturated FAs specific to sebum: sapienic acid and sebaleic acid);
  an increase in cholesterol levels, wax esters, and compounds associated with squalenes (tri-terpenes).

These lipid changes are involved in the pathogenesis of acne, since they participate in the inflammatory phenomenon, the disruption of the barrier function, hyperkeratosis, and the formation of comedones.

Beyond the increase in the quantity of sebum, the qualitative and quantitative changes in the sebaceous lipids therefore play an important role in comedogenesis and the appearance of an inflammatory site. These changes alter the physiological environment of sebocytes and keratinocytes and greatly influence the formation of acneiform lesions.

Advantageously, a hydrolysate of the rind of immature fruits of Punica granatum is able to have an effect on the quantitative and qualitative changes in the lipid profile of the sebum that are involved in acne. In particular, when applied to the skin, the active ingredient according to the invention is capable of:
  decreasing the quantity of fatty acid,
  lowering the ratio of unsaturated fatty acids to saturated fatty acids,
  reducing the quantity of squalenes,
  reducing the quantity of cholesterol,
  tending to decrease the quantity of wax.

The active ingredient according to the invention is capable of regulating the biology of sebocytes.

A. Study of the Efficacy of the Active Ingredient According to the Invention on the Lipidome of Acne-Prone Skin.

The objective of this study was to evaluate the effect of the active ingredient according to the invention, formulated at 0.5%, on the lipid profile of the sebum of skin exhibiting mild to moderate acne.

This study was carried out on 36 adult Caucasian female subjects aged between 25 and 43 years old who were affected by acne of mild to moderate intensity localized on the face and required the establishment of a treatment.

The subjects were divided into two groups:
  Placebo group: group of 18 women who applied a placebo formula to the entire face twice daily for 30 days.

Group of the active ingredient according to the invention: group of 18 women who applied a formula containing the active ingredient according to the invention to the entire face twice daily for 30 days.

The quantity and nature of the sebum lipids was assessed by sampling, on D0 and D30, followed by UPLC-MS/MS assays. The identification of the species of interest was validated by the injection of standard compounds, and the quantification of the species was carried out by adding deuterated standard compounds at known concentrations.

The results corresponding to the quantity of free fatty acids after using one of the two formulas are presented in Table 40.

TABLE 40

| | | | Placebo group | Active ingredient group | Active ingredient vs. placebo |
|---|---|---|---|---|---|
| Saturated fatty acid | Palmitic Acid | D0 | 1.985 | 2.670 | −42% |
| | | D30 | 2/337 | 2.030 | |
| Unsaturated fatty acids | Sapienic Acid | D0 | 0.622 | 0.904 | −61% |
| | | D30 | 0.798 | 0.610 | |
| | Oleic Acid | D0 | 0.644 | 1.020 | −49% |
| | | D30 | 0.753 | 0.699 | |
| | Sebaleic acid | D0 | 0.227 | 0.360 | −65% |
| | | D30 | 0.286 | 0.219 | |
| Ratio of Unsaturated fatty acids (UFA)/ Saturated fatty acids (SFA) | | D0 | 0.760 | 0.775 | −14% |
| | | D30 | 0.788 | 0.694 | |
| Squalene | | D0 | 6.677 | 8.301 | −28% |
| | | D30 | 7.594 | 7.128 | |
| Cholesterol | | D0 | 0.855 | 0.992 | −26% |
| | | D30 | 0.933 | 0.830 | |
| Wax | | D0 | 1.133 | 1.362 | −35% |
| | | D30 | 1.431 | 1.244 | |

Under the conditions of this study, 30 days after commencement of the applications, the active ingredient according to the invention formulated at 0.5% significantly improves the quality of the lipid profile of the sebum of acne-prone subjects by:
  significantly reducing the quantity of fatty acid (palmitic acid: −42%, sapienic acid: −61%, oleic acid: −49%, sebaleic acid: −65%);
  significantly lowering the ratio of unsaturated fatty acids to saturated fatty acids by 14%;
  significantly reducing the quantity of squalenes by 28%;
  significantly reducing the quantity of cholesterol by 26%; and also tending to reduce the quantity of wax by 35%.

All of the results obtained reveal good performance on the part of the care product containing the active ingredient according to the invention and confirm the benefit of the latter in adult Caucasian subjects in improving the lipid component of acne.

B. Clinical Study of the Active Ingredient According to the Invention on Skins Exhibiting Mild to Moderate Acne.

The objective of this clinical study was to evaluate the effect of the active ingredient according to the invention formulated at 0.5% as a care product intended for the treatment of skin with mild to moderate acne.

This study was carried out in 92 Caucasian adult female subjects aged between 25 and 48 years who were affected by acne of mild to moderate intensity localized on the face and required the establishment of a treatment.

The subjects were divided into two groups:
  Placebo group: group of 46 women who applied the placebo formula to the entire face for 30 days in the morning and evening.
  Active ingredient group: group of 46 women who applied the formula containing the active ingredient according to the invention to the entire face for 30 days in the morning and evening.

After 30 days of study, the evaluations were performed by the dermatologist (clinical scoring of the lesions, scoring of the severity of the acne, evaluation of the condition of the skin, and overall assessment of the care product). At each visit, the dermatologist assessed the exact number of acne lesions on the face (open comedones, closed comedones, papules, pustules, nodules, and cysts) and scored the severity of the acne using the internationally recognized GEA (Global Evaluation Acne) scale.

The GEA scale has 6 stages.

TABLE 41

| Stage 0 | Acne healed, no lesions | Residual pigmentation and/or erythema may be present. |
|---|---|---|
| Stage 1 | Acne almost healed, virtually no lesions | Rare scattered open or closed comedones and rare papules. |
| Stage 2 | Mild acne | Easily identifiable; less than half of the face is affected. A few open or closed comedones, and a few papulopustules. |
| Stage 3 | Moderate acne | More than half of the face is affected. Numerous papulopustules. Many open or closed comedones. |
| Stage 4 | Severe acne | The whole face is affected, covered with numerous papulopustules, open or closed comedones, and rare nodules. |
| Stage 5 | Very severe acne | Very inflammatory acne covering the face, with the presence of nodules. |

A decrease in the GEA score makes it possible to conclude that the corresponding treatment is clinically effective.

At each of the visits (D0 and D30), the dermatologist established a clinical condition of the skin by evaluating various parameters relating to the problem of acne-prone skin according to the following 6 criteria on a rating scale ranging from 0 to 9 (from nil to severe): intensity of seborrhea, intensity of erythema associated with pimples, extent of dilated pores, intensity of skin dryness, unevenness of skin tone, unevenness of relief.

The overall assessment of the product's efficacy was made by the dermatologist after 30 days of twice-daily application using a questionnaire containing the following items:

1) The product promotes the reduction of inflammatory lesions

2) The product promotes the reduction of retentional lesions

3) The product reduces the shiny appearance of the skin

4) The product reduces enlarged pores

5) The product has a moisturizing effect

6) The product can be used to cure mild to moderate acne

7) Overall, the product is satisfactory

For items 1 to 7, 5 rating choices were possible: totally agree, agree, disagree, totally disagree, no opinion.

The results corresponding to the counting of the total number of retentional lesions (open and closed comedones) are presented in Table 42.

TABLE 42

|  | Number of retentional lesions | | D30 vs. D0 | |
| --- | --- | --- | --- | --- |
|  | D0 | D30 | Evolution (%) | p-value |
| Placebo group | 18.2 | 12.6 | −30.9% | p < 0.01 |
| Group of the active ingredient according to the invention at 0.5% | 18.8 | 11.2 | −40.6% | p < 0.01 |

Under the conditions of this study, after 30 days of twice-daily use on the face, the group using the formula containing the active ingredient according to the invention reveals significantly more favorable outcomes than the placebo group: reduction in the number of retentional lesions by 40.6% for the group having used the formula containing the active ingredient according to the invention versus 30.9% for the group having applied the placebo formula.

The results corresponding to the counting of the total number of inflammatory lesions (papules, pustules, and nodules) are presented in Table 43.

TABLE 43

|  | Number of inflammatory lesions | | D30 vs. D0 | |
| --- | --- | --- | --- | --- |
|  | D0 | D30 | Evolution (%) | p-value |
| Placebo group | 11.5 | 7.0 | −38.9% | P < 0.01 |
| Group of the active ingredient at 0.5% | 11.3 | 5.7 | −49.2% | P < 0.01 |

Under the conditions of this study, after 30 days of twice-daily use on the face, the group using the formula containing the active ingredient according to the invention reveals more favorable outcomes than the placebo group: reduction in the number of inflammatory lesions by 49.2% for the group having used the formula containing the active ingredient according to the invention versus 38.9% for the group having applied the placebo formula.

The results corresponding to the counting of the total number of lesions (retentional+inflammatory) are presented in Table 44.

TABLE 44

|  | Total number of lesions | | D30 vs. D0 | |
| --- | --- | --- | --- | --- |
|  | D0 | D30 | Evolution (%) | p-value |
| Placebo group | 29.7 | 19.6 | −34.0% | P < 0.01 |
| Group of the active ingredient at 0.5% | 30.1 | 16.9 | −43.9% | P < 0.01 |

Under the conditions of this study, after 30 days of twice-daily use on face, the group using the formula containing the active ingredient according to the invention reveals significantly more favorable outcomes than the placebo group: reduction in the total number of lesions by 43.9% for the group having used the formula containing the active ingredient according to the invention versus 34.0% for the group having applied the placebo formula.

All of these results show the benefit of treatment with the active ingredient according to the invention in the daily care of acneic skin conditions.

The results concerning the acne severity scoring after using the formulas are shown in Table 45.

TABLE 45

|  | GEA score (arb. unit) | | D30 vs. D0 | |
| --- | --- | --- | --- | --- |
|  | D0 | D30 | Evolution (%) | p-value |
| Placebo group | 2.4 | 2.0 | −17.0% | P < 0.01 |
| Group of the active ingredient at 0.5% | 2.3 | 1.7 | −26.4% | P < 0.01 |

Under the conditions of this study, after 30 days of twice-daily use on the face, a reduction in the acne severity score of 26.4% was achieved in subjects who used the formula containing the active ingredient according to the invention and of 17.0% in subjects who applied the placebo formula.

This effect was observed in 61% of the subjects belonging to the group with the active ingredient according to the invention compared to only 33% of the subjects in the placebo group.

The results corresponding to the scoring of various parameters characteristic of the state of acne-prone skin after use of the formula with the active ingredient according to the invention or placebo are presented in Tables 46 and 47, respectively.

TABLE 46

|  | Score (arb. unit) | | D30 vs. D0 | |
| --- | --- | --- | --- | --- |
|  | D0 | D30 | Evolution (%) | p-value |
| Intensity of seborrhea | 4.4 | 2.7 | −39% | P < 0.01 |
| Intensity of erythema associated with pimples | 4.5 | 2.7 | −39% | P < 0.01 |
| Extent of dilated pores | 4.3 | 3.1 | −27% | P < 0.01 |
| Intensity of skin dryness | 1.6 | 1.5 |  | Not significant |
| Unevenness of skin tone | 4.3 | 2.7 | −37% | P < 0.01 |
| Unevenness of relief | 4.3 | 2.7 | −37% | P < 0.01 |

TABLE 47

|  | Score (arb. unit) | | D30 vs. D0 | |
| --- | --- | --- | --- | --- |
|  | D0 | D30 | Evolution (%) | p-value |
| Intensity of seborrhea | 4 5 | 3.0 | −33% | P < 0.01 |
| Intensity of erythema associated with pimples | 4.8 | 3.3 | −32% | P < 0.01 |
| Extent of dilated pores | 4.0 | 3.0 | −26% | P < 0.01 |
| Intensity of skin dryness | 1.8 | 1.7 |  | Not significant |
| Unevenness of skin tone | 4.54 | 3.0 | −32% | P < 0.01 |
| Unevenness of relief | 4. | 3.0 | −31% | P < 0.01 |

Under the conditions of this study, after 30 days of twice-daily use on the face, the group using the formula containing the active ingredient according to the invention reveals more favorable outcomes than the placebo group: intensity of seborrhea (−39% versus 33%), intensity of erythema associated with pimples (−39% versus −32%), extent of dilated pores (−27% versus −26%), unevenness of skin tone (−37% versus −32%), and unevenness of relief (−37% versus −31%), These results show the benefit of treatment with the active ingredient according to the invention in the daily care of acneic skin conditions.

C. Study of the Immediate and Residual Effect Following a Single Application.

The objective of this study is to evaluate, in vivo, the immediate effect in the form of a film on subjects after 10 minutes of application as well as after a persistence period of 6 hours after application, corresponding to an effect on the day.

This study was carried out on 21 healthy Caucasian female subjects aged 34 t 8 years. In particular, the inventors studied the moisturizing effect by measuring the hydration level on the cheeks using a Corneometer® CM 820 (Courage and Khazaka) and the effect on the level of sebum on the forehead using a Sebumeter® (Courage and Khazaka) after a single application of the active ingredient in the form of a film according to Example 3 for 20 minutes.

Study Results

TABLE 48

|  | 3 hours after application | | 6 hours after application | |
| --- | --- | --- | --- | --- |
|  | Variation/ before application (%) | % of subjects showing an effect | Variation/ before application (%) | % of subjects showing an effect |
| Hydration level | +40 | 100 | +34 | 94 |
| Sebum level | −20 | 88 | −15 | 76 |

The active ingredient according to the invention in the form of a film increases the hydration level of the skin throughout the day. Indeed, immediately after application, a significant increase of 45% was observed, and this effect is visible for 100% of subjects. This hydration level is maintained throughout the day, with a significant increase maintained at 40% in 100% of subjects after 3 hours and at 34% 6 hours after application in 94% of subjects.

The active ingredient according to the invention in the form of a film reduces the sebum of the skin throughout the day. In fact, immediately after application, a significant reduction of 51% in the level of sebum was observed in 100% of the subjects. This variation is maintained throughout the day, with a significant decrease maintained at 20% in 88% of subjects after 3 hours and at 15% in 76% of subjects.

Thus, after a single application of 20 minutes, the active ingredient according to the invention in the form of a film significantly improves skin hydration while reducing the level of sebum in the skin. All of these effects are maintained throughout the day.

D. Long-Term Effect of the Active Ingredient According to the Invention.

During this study, the in vivo effect of the active ingredient according to the invention in the form of a film was evaluated after a course of treatment of 6 applications for 20 minutes over a period of 14 days and 12 applications for 20 minutes over a period of 28 days. This study was carried out on 18 healthy Caucasian female subjects aged 33±8 years. The inventors studied the moisturizing effect by measuring the hydration level of the skin using a Corneometer® CM 820 (Courage and Khazaka) and the effect on sebum levels using a Sebumeter® (Courage and Khazaka).

Study Results

TABLE 49

|  | D14, after 6 applications | | D28, after 12 applications | |
| --- | --- | --- | --- | --- |
|  | Variation/ before application (%) | % of subjects showing an effect | Variation/ before application (%) | % of subjects showing an effect |
| Hydration level | +37 | 72 | +40 | 83 |
| Sebum level | −22 | 83 | −24 | 83 |

When used as a course of treatment, the active ingredient according to the invention in the form of a film significantly increases the hydration of the skin by 37% in 72% of subjects after 6 applications and by 40% in 83% of subjects after 12 applications.

When used as a course of treatment, the active ingredient according to the invention in the form of a film significantly reduces the level of sebum by 22% in 83% of subjects after 6 applications and by 24% in 83% of subjects after 12 applications.

The invention claimed is:

1. A method for obtaining an active ingredient, comprising at least one hydrolysate of the rind of immature fruits of *Punica granata*, wherein the method comprises at least one aqueous extraction and enzymatic hydrolysis, the method comprises at least the following steps:
    a. solubilization of powder of the rind of immature *Punica granatum* fruit in water in a proportion of at least 50 g/l,
    b. enzymatic hydrolysis with the aid of a carbohydrase,
    c. separation of soluble and insoluble phases,
    d. recovery of the soluble phase and thermal enzymatic inactivation, and
    e. purification of polyphenolic compounds.

2. The method for obtaining an active ingredient as set forth in claim 1, wherein the immature fruits of *Punica granatum* have a diameter of less than 10 cm.

3. The method for obtaining an active ingredient as set forth in claim 1, wherein the active ingredient comprises polyphenols, sugars, minerals, and proteins.

4. The method for obtaining an active ingredient as set forth in claim 1, wherein the hydrolysate comprises at least 35% by weight of polyphenols relative to the dry matter weight of the hydrolysate.

5. The method for obtaining an active ingredient as set forth in claim 1, wherein the hydrolysate comprises at least 25% by weight of sugars relative to the dry matter weight of the hydrolysate.

6. The method for obtaining an active ingredient as set forth in claim 1, wherein the polyphenols present in the hydrolysate are at least partly Ellagitannins.

7. The method for obtaining an active ingredient as set forth in claim 1, wherein the Ellagitannins represent the totality of the polyphenols of the hydrolysate.

8. The method for obtaining an active ingredient as set forth in claim 1, wherein the Ellagitannins present in the hydrolysate are at least partly Punicalagin and derivatives thereof, Punicalin, derivatives of HHDP, and Ellagic acid.

9. The method for obtaining an active ingredient as set forth in claim 1, wherein the active ingredient is formulated as a composition comprising at least 0.05% by weight of the active ingredient in liquid form.

10. The method of claim 9, wherein the composition is in the form of a gel, a lotion, an emulsion, a cream, or an ointment.

\* \* \* \* \*